United States Patent
Hagaribommanahalli et al.

(10) Patent No.: US 12,280,808 B2
(45) Date of Patent: Apr. 22, 2025

(54) ROAD USER CATEGORIZATION THROUGH MONITORING

(71) Applicant: Nissan North America, Inc., Franklin, TN (US)

(72) Inventors: Sachin Hagaribommanahalli, Sunnyvale, CA (US); Christopher Ostafew, Mountain View, CA (US); David Ilstrup, Santa Cruz, CA (US)

(73) Assignee: Nissan North America, Inc., Franklin, TN (US)

( * ) Notice: Subject to any disclaimer, the term of this patent is extended or adjusted under 35 U.S.C. 154(b) by 213 days.

(21) Appl. No.: 17/331,176

(22) Filed: May 26, 2021

(65) Prior Publication Data

US 2022/0379923 A1    Dec. 1, 2022

(51) Int. Cl.
  *B60W 60/00*     (2020.01)
  *G05D 1/00*      (2024.01)
  *G08G 1/01*      (2006.01)

(52) U.S. Cl.
  CPC ....... *B60W 60/0027* (2020.02); *G05D 1/0214* (2013.01); *G08G 1/0141* (2013.01); *B60W 2552/53* (2020.02); *B60W 2554/4041* (2020.02); *B60W 2554/4046* (2020.02); *B60W 2554/4047* (2020.02); *B60W 2554/4048* (2020.02); *B60W 2554/802* (2020.02); *B60W 2556/10* (2020.02); *B60W 2556/65* (2020.02)

(58) Field of Classification Search
  CPC ..... B60W 60/0027; B60W 2554/4041; B60W 2556/10; B60W 2552/53; B60W 2556/65; B60W 2554/802; B60W 2554/4046; B60W 2554/4048; B60W 2554/4047; G05D 1/0214; G05D 2201/0213; G08G 1/0141
  See application file for complete search history.

(56) References Cited

U.S. PATENT DOCUMENTS

| | | | |
|---|---|---|---|
| 9,475,491 B1 * | 10/2016 | Nagasaka | B60W 30/16 |
| 10,621,795 B2 * | 4/2020 | Grush | G06Q 40/00 |
| 2009/0030605 A1 * | 1/2009 | Breed | B60W 30/18154 340/901 |
| 2016/0133130 A1 * | 5/2016 | Grimm | G08G 1/0129 340/905 |
| 2017/0305422 A1 * | 10/2017 | Ito | B60W 30/16 |

(Continued)

FOREIGN PATENT DOCUMENTS

| WO | WO-2010011806 A1 * | 1/2010 | G07C 5/008 |
|---|---|---|---|

*Primary Examiner* — Dale W Hilgendorf
*Assistant Examiner* — Frank T Glenn, III
(74) *Attorney, Agent, or Firm* — Young Basile Hanlon & MacFarlane, P.C.

(57) ABSTRACT

Categorizing driving behaviors of other road users includes maintaining a first history of first lateral-offset values of a road user with respect to a center line of a lane of a road; determining a first pattern based on the first history of the first lateral-offset values; determining a driving behavior of the road user based on the first pattern; and autonomously performing, by a host vehicle, a driving maneuver based on the driving behavior of the road user. The first history can be maintained for a predetermined period of time. An apparatus includes a processor that is configured to track a trajectory history of a road user; determine, based on the trajectory history, a driving behavior of the road user; and transmit a notification of the driving behavior.

14 Claims, 10 Drawing Sheets

(56) References Cited

U.S. PATENT DOCUMENTS

| | | | |
|---|---|---|---|
| 2018/0050698 A1* | 2/2018 | Polisson | G05D 1/0061 |
| 2018/0077865 A1* | 3/2018 | Gallmeier | G05D 1/0274 |
| 2018/0144636 A1* | 5/2018 | Becker | B60W 30/0956 |
| 2018/0237007 A1* | 8/2018 | Adam | B60W 50/14 |
| 2019/0071072 A1* | 3/2019 | Seo | B60W 30/18163 |
| 2020/0307565 A1* | 10/2020 | Ward | B60W 30/0956 |
| 2020/0320864 A1* | 10/2020 | Wengreen | G08G 1/0112 |

\* cited by examiner

ROAD USER CATEGORIZATION THROUGH MONITORING

TECHNICAL FIELD

This application relates to autonomous vehicles, including methods, apparatuses, systems, and non-transitory computer-readable media for road user categorization through monitoring.

BACKGROUND

Autonomous vehicles (or more broadly, autonomous driving) offer human drivers the convenience of efficient conveyance from one location to another without having to direct their attention to the state of the road. An autonomous vehicle may plan a trajectory to traverse a portion of a vehicle transportation network that may be simultaneously traversed by other road users.

Autonomous driving must be carried out safely. Safely traversing a vehicle transportation network includes defensive driving, which can include detecting atypical or non-normal driving behaviors of other road users and avoiding those road users.

SUMMARY

A first aspect is a method of categorizing driving behaviors of other road users. The method includes maintaining a first history of first lateral-offset values of a road user with respect to a center line of a lane of a road; determining a first pattern based on the first history of the first lateral-offset values; determining a driving behavior of the road user based on the first pattern; and autonomously performing, by a host vehicle, a driving maneuver based on the driving behavior of the road user. The first history can be maintained for a predetermined period of time.

A second aspect is an apparatus that includes a processor. The processor is configured to track a trajectory history of a road user; determine, based on the trajectory history, a driving behavior of the road user; and transmit a notification of the driving behavior.

A third aspect is a non-transitory computer-readable storage medium of a host vehicle that includes executable instructions that, when executed by a processor, perform operations to store, in a circular buffer, road user poses of a road user; obtain lateral-offset values using the road use poses and corresponding map poses of a high definition map; determine a driving behavior of the road user based on the lateral-offset values; determine, based on the driving behavior, a trajectory that includes a driving maneuver; and control the host vehicle according to the trajectory.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
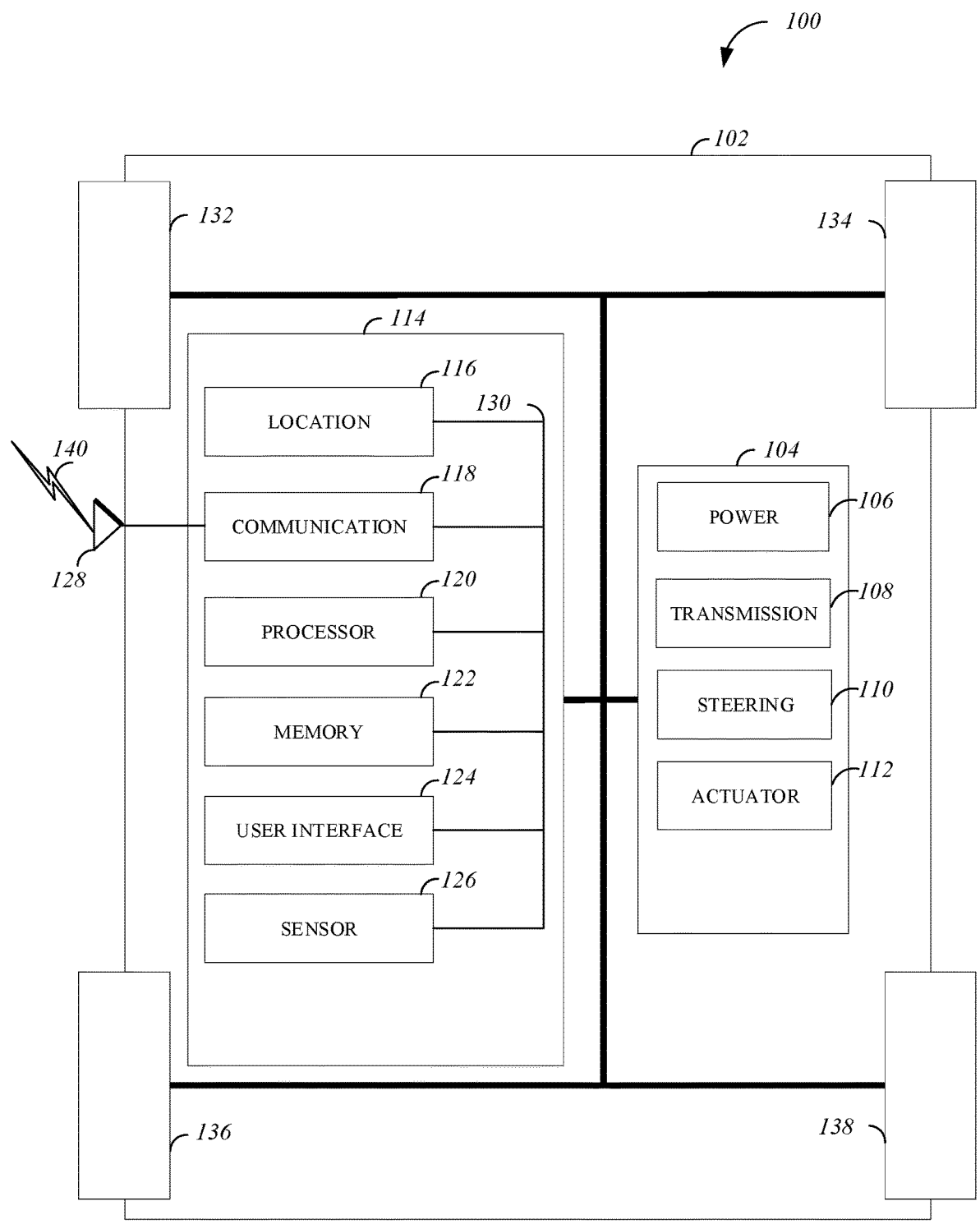
FIG. 1 is a diagram of an example of a portion of a vehicle in which the aspects, features, and elements disclosed herein may be implemented.

A vehicle, such as an autonomous vehicle (AV) or a semi-autonomous vehicle (collectively, autonomous vehicle), may traverse a portion of a vehicle transportation network. Autonomously traversing the vehicle transportation network, as used herein, can mean that the vehicle is configured to be in an autonomous mode in which the vehicle navigates through the vehicle transportation network with little or no input from a human driver.

The vehicle may include one or more sensors. Traversing the vehicle transportation network may include the sensors generating or capturing sensor data, such as data corresponding to an operational environment of the vehicle, or a portion thereof. For example, the sensor data may include information corresponding to one or more external objects (or simply, objects) including other road users (such as other vehicles, bicycles, motorcycles, trucks, etc.) that may also be traversing the vehicle transportation network.

An external object can be a dynamic (i.e., moving) object, such as a pedestrian, a remote vehicle, a motorcycle, a bicycle, etc. The dynamic object can be oncoming (toward the vehicle) or can be moving in the same direction as the vehicle. The dynamic object can be moving longitudinally or laterally with respect to the vehicle. A static object can become a dynamic object, and vice versa.

In a driving scenario, a road user (e.g., a vehicle) may generally be driven (such as by a human driver) in (or close to) the middle of a lane and according to a speed limit. Such driving behavior may be referred to as normal driving behavior. However, other road users may be driven according to non-normal driving behaviors. Non-normal driving behaviors, which are further described herein, can include a distracted driving behavior, an inebriated driving behavior, an aggressive driving behavior, a reckless driving behavior, or a cautious driving behavior. Other driving behaviors are possible. As used herein, that a road user is exhibiting a particular driving behavior or that the road user has, or is determined to have, the particular driving behavior can mean that the road user (e.g., a truck) is being driven or is determined as being driven (such as autonomously or by a human driver) according to the particular driving behavior. Categorizing a road user, as used herein, can mean to determine (e.g., detect, identify, infer, etc.) a driving behavior of the road user.

Non-normal driving behaviors of other road users may cause road accidents or at least increase the risk of road accidents. Implementations according to this disclosure can determine the driving behaviors of other road users. In an example, the driving behaviors of the road users can be used for decision-making and pro-active risk mitigation in an autonomous vehicle (i.e., a host vehicle). As such, responsive to a determination that a road user has a non-normal driving behavior, a trajectory planner of the host vehicle can plan a trajectory, including a driving maneuver, and the host vehicle can be controlled according to the trajectory so as to perform the driving maneuver (e.g., a defensive driving maneuver) that avoids the risk. The driving behavior of a road user can be determined using lateral offsets of the road user from a driveline, observed travelling speeds of the road user, other criteria, or a combination thereof.

Although described herein with reference to an autonomous host vehicle, the techniques and apparatuses described herein may be implemented in any vehicle capable of autonomous or semi-autonomous operation. Although described with reference to a vehicle transportation network, the method and apparatus described herein may include the autonomous vehicle operating in any area navigable by the host vehicle.

In some implementations, road user categorization through monitoring can be used in a manually driven vehicle. For example, the techniques and apparatuses described herein may determine driving behaviors of one or more road users. The human driver can be alerted of road users with non-normal driving behaviors. In some implementations, the human driver may be provided with recommendations of driving maneuvers that minimize safety risks in view of the non-normal driving behaviors.

Road user categorization through monitoring can be used to detect different driving behaviors for host vehicle or other road user notifications, autonomous defensive driving, safer decision making in autonomous driving, and safer trajectory planning.

To describe some implementations of the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
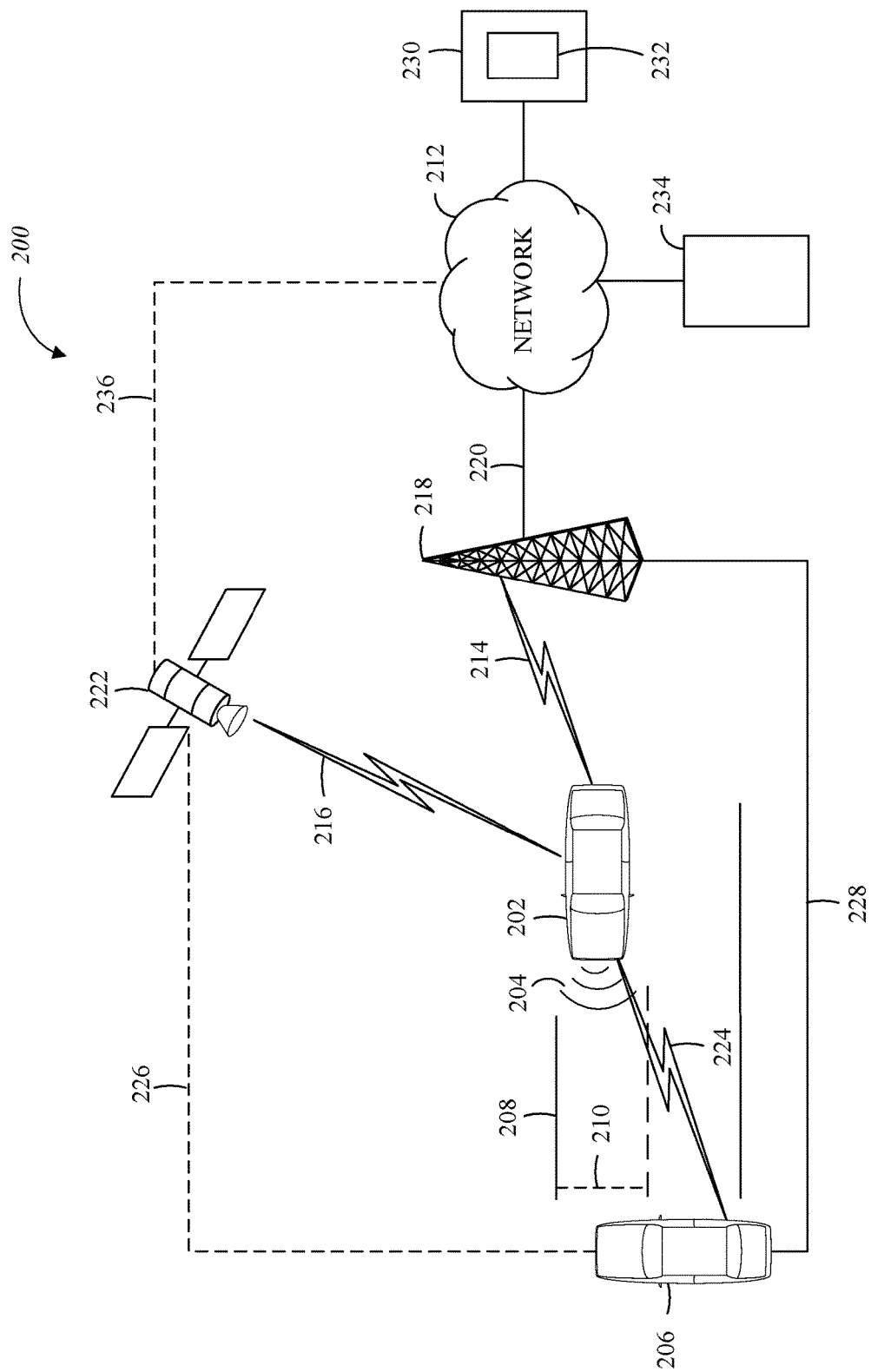
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
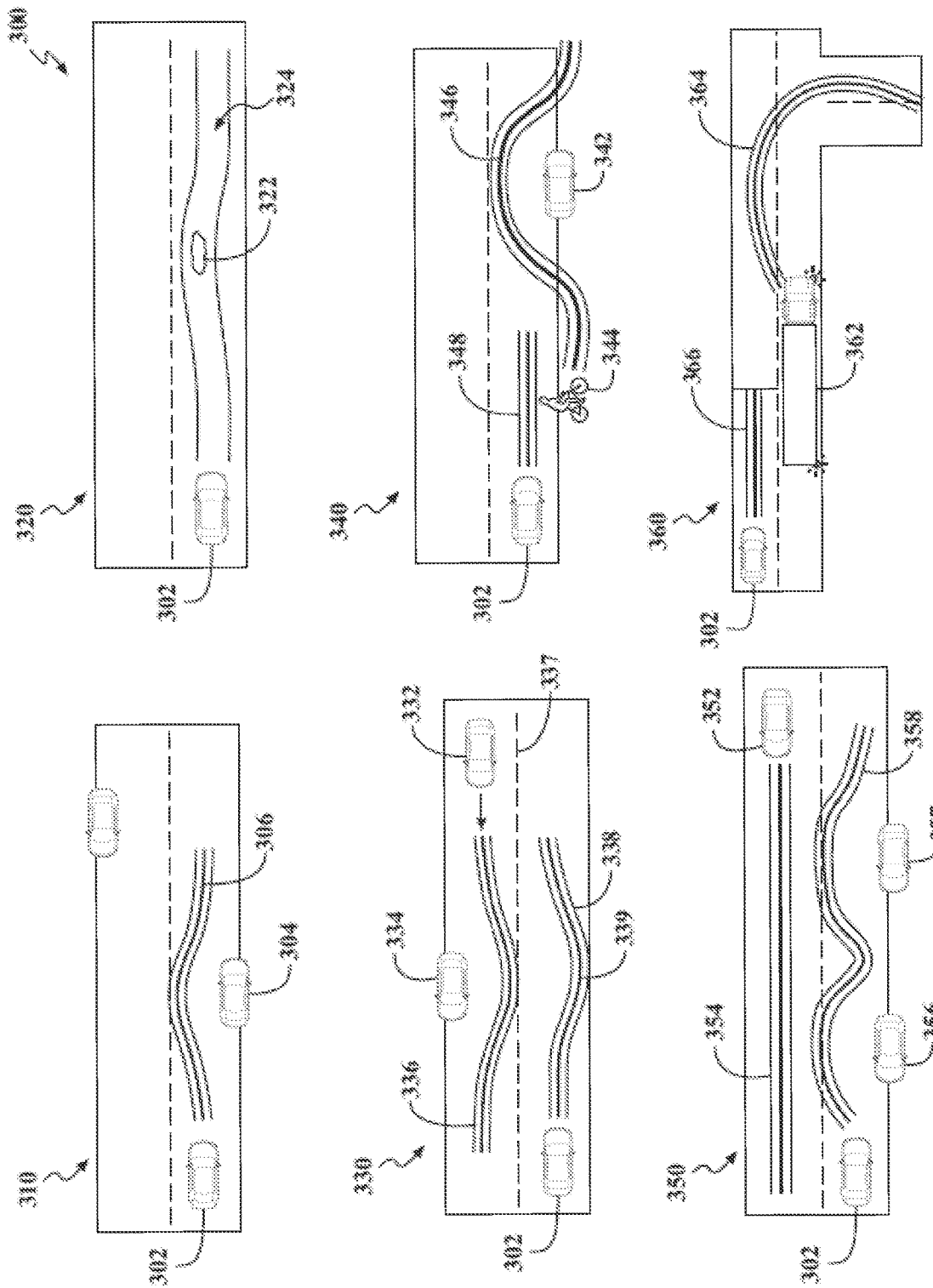
FIG. 3 is a diagram of situations of predictable responses.

FIG. 3 is a diagram of situations 300 of predictable responses. The situations 300 include situations 310-360 in which responses of an autonomous vehicle (AV) 302 can be predicted and a trajectory planned.

The situations 300 represent examples of predictable situations and responses of road users. The situations take place (e.g., happen, occur, etc.) at a slow time scale. That is, even if the AV 302 might be going at a high speed (e.g., 60 miles per hour (MPH)), the situations 310-360 are considered to be slow scenarios because, due to the computing power (e.g., the computing power of a processor, such as the processor 120 of FIG. 1, and/or a controller, such as the controller 114 of FIG. 1) of the AV 302, predicting responses of external objects and determining a trajectory for the autonomous vehicle can be accomplished within a sub-second of elapsed time.

The AV 302 can include a world modeling module, which can track at least some detected external objects. The world modeling module can predict one or more potential hypotheses (i.e., trajectories, paths, or the like) for each tracked object of at least some of the tracked objects. The AV 302 can include a trajectory planning system (or, simply, a trajectory planner) that can be executed by a processor to generate (considering an initial state, desired actions, and at least some tracked objects with predicted trajectories) a collision-avoiding, law-abiding, comfortable response (e.g., trajectory, path, etc.).

In the situation 310, the AV 302 detects (i.e., by the tracking component) a parked car 304 (i.e., a static object) at the side of the road. The AV 302 (i.e., the trajectory planner of the AV 302) can plan a path (i.e., trajectory), as further described below, that navigates the AV 302 around the parked car 304, as shown by a trajectory 306.

The situation 320 is another situation where the AV 302 detects another static object. The detected static object is a pothole 322. The AV 302 can plan a trajectory 324 such that the AV 302 drives over the pothole 322 in a way that none of the tires of the AV 302 drive into the pothole 322.

In the situation 330, the AV 302 detects an oncoming vehicle 332 and a parked vehicle 334 that is on the same side of the road as the oncoming vehicle 332. The oncoming vehicle 332 is moving. As such, the oncoming vehicle 332 is a dynamic object. The oncoming vehicle 332 is moving in the same (or at least substantially the same) longitudinal direction as the AV 302. As such, the oncoming vehicle 332 can be classified as a longitudinal constraint, as further described below. The oncoming vehicle 332 is moving in the direction opposite that of the AV 302. As such, the oncoming vehicle 332 can be classified as an oncoming longitudinal constraint. The parked vehicle 334 is a static object.

The AV 302 can predict (i.e., by the prediction component), with a certain degree of certainty that exceeds a threshold, that the oncoming vehicle 332 is likely to follow a trajectory 336 in order to avoid (e.g., get around) the parked vehicle 334. The trajectory 336 overlaps a centerline 337 of the road. In order to keep a safe distance from the oncoming vehicle 332, the trajectory planner of the AV 302 can plan a trajectory 338 that includes a curvature at location 339. That is, the planned trajectory of the AV 302 moves the AV 302 to the right in anticipation of the route of the oncoming vehicle 332.

In the situation 340, the tracking component of the AV 302 can detect a parked vehicle 342 (i.e., a static object) and a bicycle 344 that is moving (i.e., a dynamic object that is a longitudinal constraint). The prediction component may determine, with a certain degree of certainty, that the bicycle 344 will follow a trajectory 346 to get around the parked vehicle 342. As such, the AV 302 determines (i.e., plans, calculates, selects, generates, or otherwise determines) a trajectory 348 such that the AV 302 slows down to allow the bicycle 344 to pass the parked vehicle 342. In another example, the AV 302 can determine more than one possible trajectory. For example, the AV 302 can determine a first trajectory as described above, a second trajectory whereby the AV 302 accelerates to pass the bicycle 344 before the bicycle 344 passes the parked car, and a third trajectory whereby the AV 302 passes around the bicycle 344 as the bicycle 344 is passing the parked vehicle 342. The trajectory planner then selects one of the determined possible trajectories.

In the situation 350, the tracking component of the AV 302 detects an oncoming vehicle 352, a first parked vehicle 356, and a second parked vehicle 357. The prediction component of the AV 302 determines that the oncoming vehicle 352 is following a trajectory 354. The AV 302 selects a trajectory 358 such that the AV 302 passes the first parked vehicle 356, waits between the first parked vehicle 356 and the second parked vehicle 357 until the oncoming vehicle 352 passes, and then proceeds to pass the second parked vehicle 357.

In the situation 360, the prediction component of the AV 302 determines that a large truck 362 is most likely turning right. The trajectory planner determines (e.g., based on a motion model of a large truck) that, since a large truck requires a large turning radius, the large truck 362 is likely to follow a trajectory 364. As the trajectory 364 interferes with the path of the AV 302, the trajectory planner of the AV 302 determines a trajectory 366 for the AV 302, such that the AV 302 is brought to a stop until the large truck 362 is out of the way.

Figure 4:
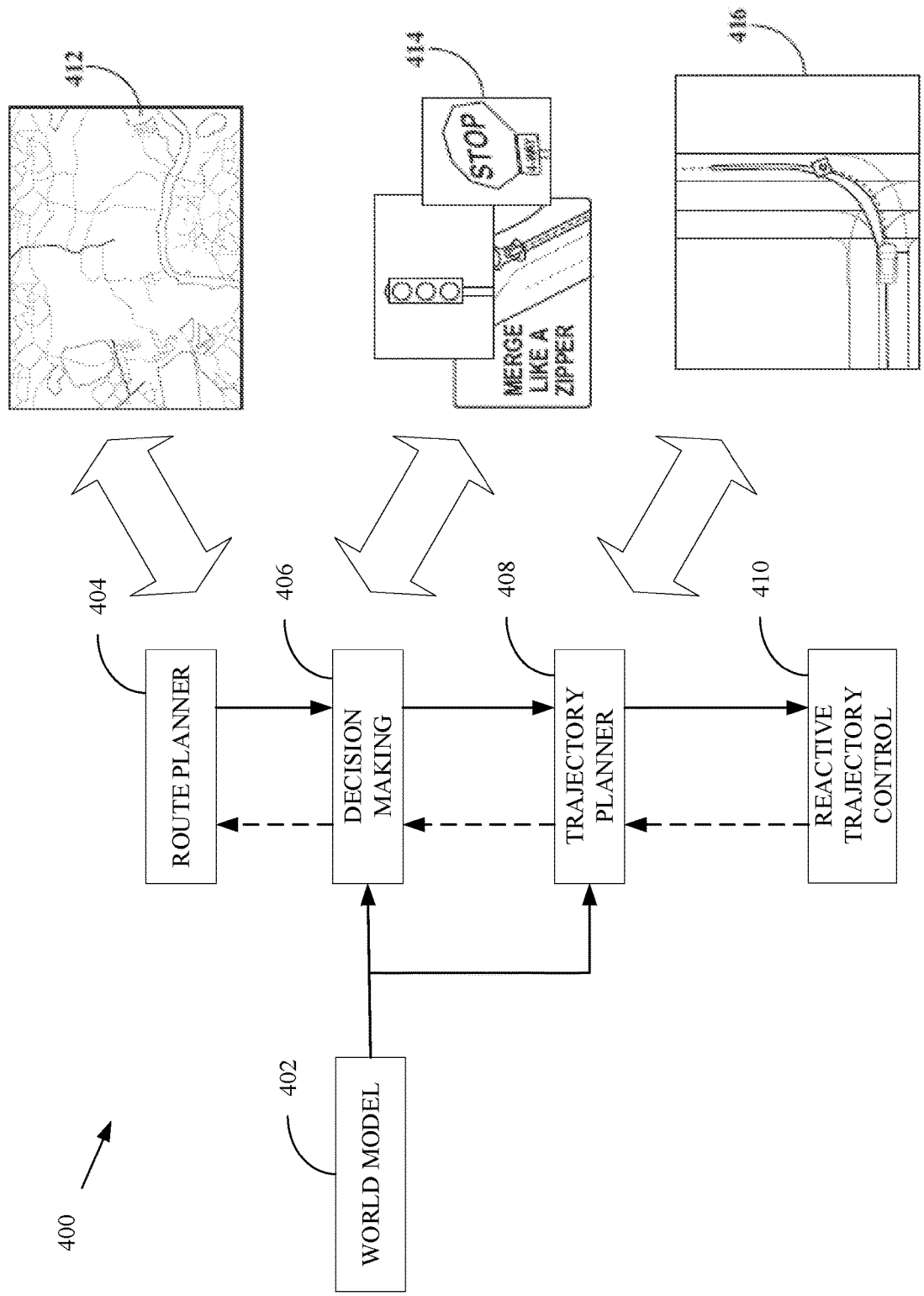
FIG. 4 is an example of components of a system for an autonomous vehicle.

FIG. 4 is an example of components of a system 400 for an autonomous vehicle. The system 400 represents a software pipeline of an autonomous vehicle, such as the vehicle 100 of FIG. 1. The system 400 includes a world model module 402, a route planning module 404, a decision making module 406, a trajectory planner 408, and a reactive trajectory control module 410. Other examples of the system 400 can include more, fewer, or other modules. In some examples, the modules can be combined; in other examples, a module can be divided into one or more other modules.

The world model module 402 receives sensor data, such as from the sensor 126 of FIG. 1, and determines (e.g., converts to, detects, etc.) objects from the sensor data. That is, for example, the world model module 402 determines the road users from the received sensor data. For example, the world model module 402 can convert a point cloud received from a light detection and ranging (LiDAR) sensor (i.e., a sensor of the sensor 126) into an object. Sensor data from several sensors can be fused together to determine (e.g., guess the identity of) the objects. Examples of objects include a bicycle, a pedestrian, a vehicle, etc.

The world model module 402 can receive sensor information that allows the world model module 402 to calculate and maintain additional information for at least some of the detected objects. For example, the world model module 402 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model module 402 fuses sensor information, tracks objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability 90% considering the object pose/velocity and the trajectory poses/velocities). In an example, the world model module 402 uses an instance of the trajectory planner, which generates a reference driveline for each object hypothesis for at least some of the dynamic objects. For example, one or more instances of the trajectory planner can be used to generate reference drivelines for vehicles, bicycles, and pedestrians. In another example, an instance of the trajectory planner can be used to generate reference drivelines for vehicles and bicycles, and a different method can be used to generate reference drivelines (e.g., references paths) for pedestrians.

The objects maintained by the world model module 402 can include static objects and/or dynamic objects.

The route planning module 404 determines a road-level plan, such as illustrated with respect to a road-level plan 412. For example, given a starting location and a destination location, the route planning module 404 determines a route from the starting location to the destination location. For example, the route planning module 404 can determine the list of roads (i.e., the road-level plan) to be followed by the AV to navigate from the starting location to the destination location.

The road-level plan determined by the route planning module 404 and the objects (and corresponding state information) maintained by the world model module 402 can be used by the decision making module 406 to determine discrete-level decisions along the road-level plan. An example of decisions included in the discrete-level decisions is illustrated with respect to discrete decisions 414. An example of discrete-level decisions may include a decision to stop at the interaction between road A and road B, a decision to move forward slowly, a decision to accelerate to a certain speed limit, a decision to merge onto the rightmost lane, etc.

The trajectory planner 408 can receive the discrete-level decisions, the objects (and corresponding state information) maintained by the world model module 402, and the predicted trajectories and likelihoods of the external objects from the world model module 402. The trajectory planner 408 can use at least some of the received information to determine a detailed-planned trajectory for the autonomous vehicle.

For example, as illustrated with respect to a detailed-planned trajectory 416, the trajectory planner 408 determines a next-few-seconds trajectory. As such, and in an example where the next few seconds are the next 6 seconds (i.e., a look-ahead time of 6 seconds), the trajectory planner 408 determines a trajectory and locations for the autonomous vehicle in the next 6 seconds. For example, the trajectory planner 408 may determine (e.g., predict, calculate, etc.) the expected locations of the autonomous vehicle at several time intervals (e.g., every one-quarter of a second, or some other time intervals). The trajectory planner 408 can determine the detailed-planned trajectory based on predictable responses of other road users, as described, for example, with respect to FIG. 3.

The reactive trajectory control module 410 can handle situations that the autonomous vehicle may encounter but are unpredictable (e.g., cannot be handled) by the trajectory planner 408. Such situations include situations where the detailed-planned trajectory of the trajectory planner 408 was based on misclassification of objects and/or unanticipated situations that rarely occur. For example, the reactive trajectory control module 410 can modify the detailed-planned trajectory in response to determining that the static object to the left of the autonomous vehicle is misclassified. For example, the object may have been classified as a large truck; however, a new classification determines that it is a static road barrier wall. In another example, the reactive trajectory control module 410 can modify the detailed-planned trajectory in response to a sudden tire blowout of the autonomous vehicle. Other examples of unanticipated situations include other vehicles swerving suddenly (e.g., due to late decision to get to highway off-ramp or tire blowout) into the lane of the AV and pedestrians or other objects emerging suddenly from behind occlusions.

Figure 5:
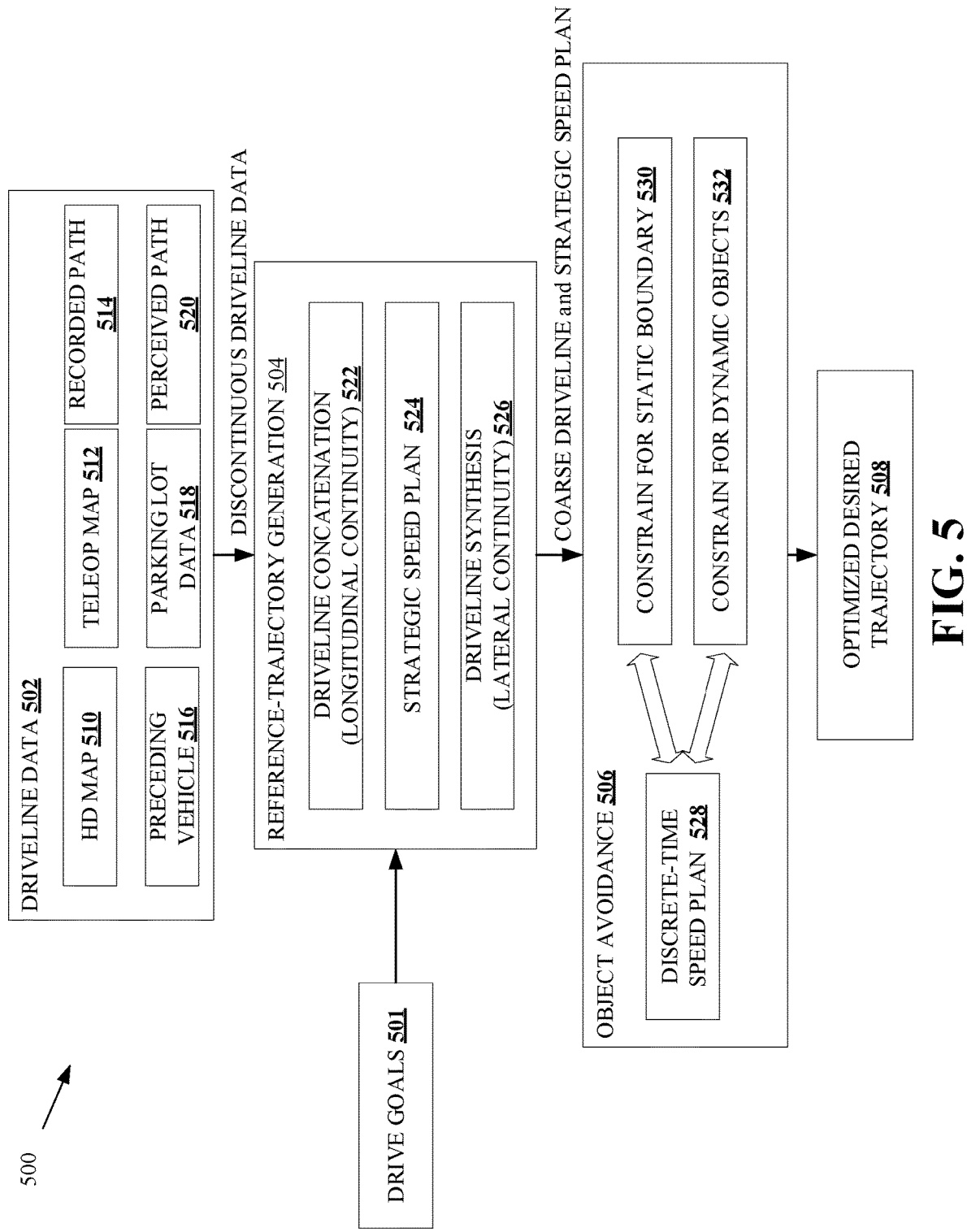
FIG. 5 is an example of layers of a trajectory planner for an autonomous vehicle.

FIG. 5 is an example of layers of a trajectory planner 500 for an autonomous vehicle. The trajectory planner 500 can be, or can be a part of, the trajectory planner 408 of FIG. 4. The trajectory planner 500 can receive drive goals 501. The trajectory planner 500 can receive a sequence of drive goals 501 that can represent, for example, a series of lane selections and speed limits that connect a first location to a second location. For example, a drive goal of the drive goals 501 can be "starting at location x, travel on a lane having a certain identifier (e.g., lane with an identifier that is equal to A123) while respecting speed limit y". The trajectory planner 500 can be used to generate a trajectory that accomplishes the sequence of the drive goals 501.

The trajectory planner 500 includes a driveline data layer 502, a reference-trajectory generation layer 504, an object avoidance layer 506, and a trajectory optimization layer 508. The trajectory planner 500 generates an optimized trajectory. Other examples of the trajectory planner 500 can include more, fewer, or other layers. In some examples, the layers can be combined; in other examples, a layer can be divided into one or more other layers.

The driveline data layer 502 includes the input data that can be used by the trajectory planner 500. The driveline data can be used (e.g., by the reference-trajectory generation layer 504) to determine (i.e., generate, calculate, select, or otherwise determine) a coarse driveline from a first location to a second location. The driveline can be thought of as the line in the road over which the longitudinal axis of the AV coincides as the AV moves along the road. As such, the driveline data is data that can be used to determine the driveline. The driveline is coarse, at this point, and may contain lateral discontinuities such as when directed to transition laterally between adjacent lanes. The driveline at this point is also not yet adjusted for objects encountered by the AV, as further described below.

In an example, the driveline data layer 502 can include one or more of High Definition (HD) map data 510, teleoperation map data 512, recorded paths data 514, preceding vehicle data 516, parking lot data 518, and perceived path data 520.

The HD map data 510 is data from a high-definition (i.e., high-precision) map, which can be used by an autonomous vehicle. The HD map data 510 can include accurate information regarding a vehicle transportation network to within a few centimeters. For example, the HD map data 510 can include details regarding road lanes, road dividers, traffic signals, traffic signs, speed limits, and the like.

The teleoperation map data 512 can include relatively short driveline data. For example, the teleoperation map data 512 can be driveline data that are 100 meters to 200 meters long. However, the teleoperation map data 512 is not necessarily so limited. The teleoperation map data 512 can be manually generated by a teleoperator in response to, or in anticipation of, exceptional situations that the AV is not capable of automatically handling.

The driveline may be created in real time. To illustrate creating the driveline in real time, an example is now provided. A teleoperator may be remotely observing the AV raw sensor data. For example, the teleoperator may see (such as on a remote monitor) construction-site pylons (e.g., captured by a camera of the AV) and draw a path for the AV through a construction zone. The teleoperator may then watch a flag person giving the go-ahead to the AV, at which point the teleoperator can cause the AV to proceed along the drawn path.

To reduce processing time of manually drawing the path when an AV reaches an exceptional situation that was previously encountered, the driveline data can also be stored remotely and sent to the AV as needed.

The recorded paths data 514 can include data regarding paths previously followed by the autonomous vehicle. In an example, an operator (e.g., a driver or a remote operator) of the autonomous vehicle may have recorded a path from the street into the garage of a home.

The preceding vehicle data 516 can be data received from one or more vehicles that precede the autonomous vehicle along a generally same trajectory as the autonomous vehicle. In an example, the autonomous vehicle and a preceding vehicle can communicate via a wireless communication link, such as described with respect to FIG. 2. As such, the autonomous vehicle can receive trajectory and/or other information from the preceding vehicle via the wireless communication link. The preceding vehicle data 516 can also be perceived (e.g., followed) without an explicit communication link. For example, the AV can track the preceding vehicle and can estimate a vehicle driveline of the preceding vehicle based on the tracking results.

The parking lot data 518 includes data regarding locations of parking lots and/or parking spaces. In an example, the parking lot data 518 can be used to predict trajectories of other vehicles. For example, if a parking lot entrance is proximate to another vehicle, one of the predicted trajectories of the other vehicle may be that the other vehicle will enter the parking lot.

In some situations map, (e.g., HD map) information may not be available for portions of the vehicle transportation network. As such, the perceived path data 520 can represent drivelines where there is no previously mapped information. Instead, the AV can detect drivelines in real time using fewer, more, or other than lane markings, curbs, and road limits. In an example, road limits can be detected based on transitions from one terrain type (e.g., pavement) to other terrain types (e.g., gravel or grass). Other ways can be used to detect drivelines in real time.

Figure 6:
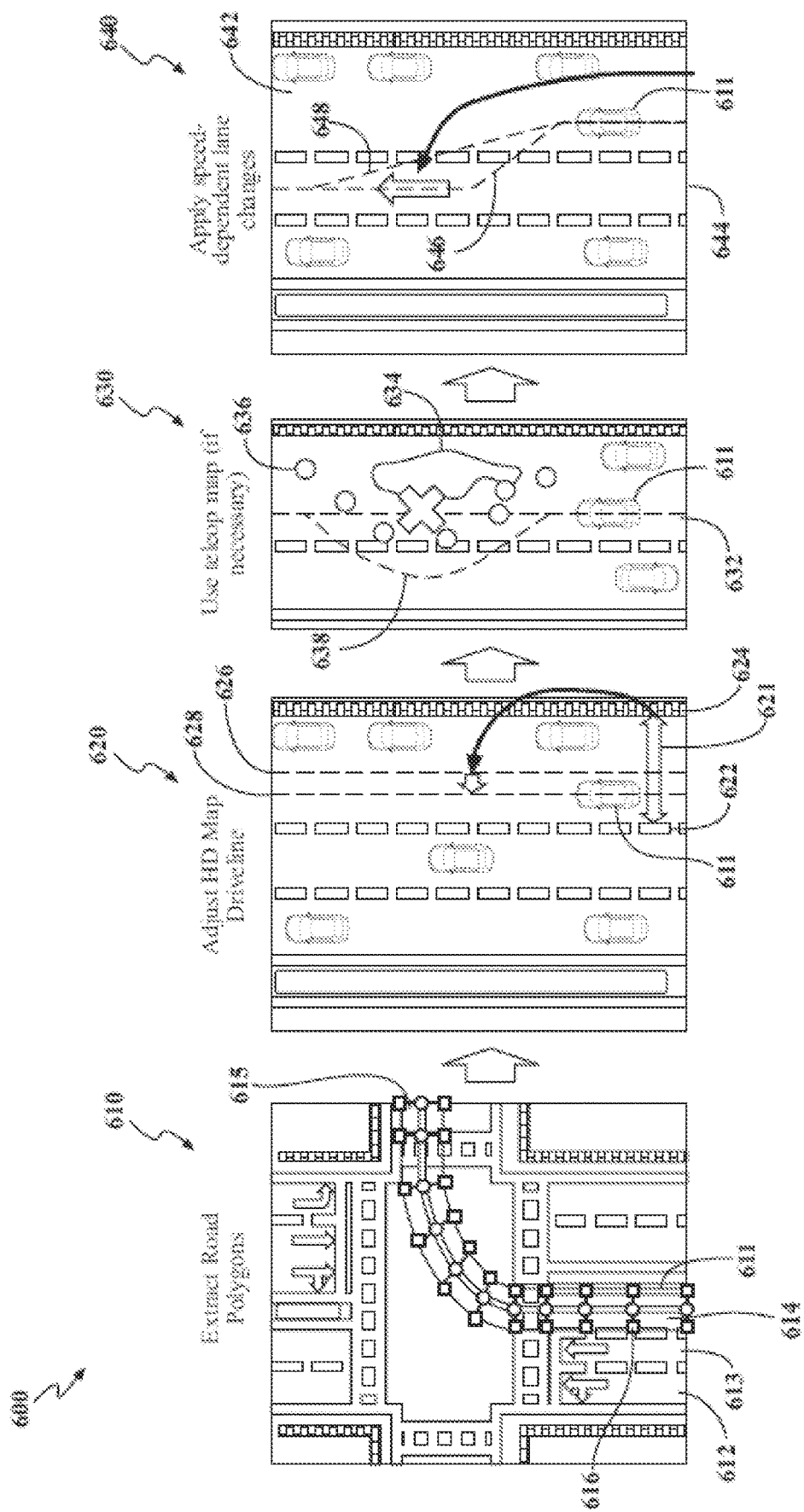
FIG. 6 is an illustration of examples of coarse-driveline concatenation.

The reference-trajectory generation layer 504 can include a driveline concatenation module 522, a strategic speed plan module 524, and a driveline synthesis module 526. The reference-trajectory generation layer 504 provides the coarse driveline to a discrete-time speed plan module 528. If an object is a static object and an adjusted drivable area is passable (e.g., the AV can pass through one or more gaps in the drivable area or the adjusted drivable area, as the case may be), then a module 530 can apply static constraints (e.g., lateral constraints) to determine an adjusted drivable area. A module 532 can determine (e.g., predict) the locations of the AV at different discrete points in time. That is, the module 532 determines locations of arrivals, along the coarse driveline, at different time points. If an object is a dynamic object and the object is a lateral constraint, then the module 532 can adjust the drivable area based on the arrival locations so as to avoid collisions. FIG. 6 illustrates an example of the operation of the reference-trajectory generation layer 504.

It is noted that the route planning module 404 can generate a lane ID sequence, which is used to travel from a first location to a second location thereby corresponding to (e.g., providing) the drive goals 501. As such, the drive goals 501 can be, for example, hundreds of meters apart, depending on the length of a lane. In the case of the HD map data 510, for example, the reference-trajectory generation layer 504 can use a combination of a location (e.g., GPS location, 3D Cartesian coordinates, etc.) and a lane (e.g., the identifier of the lane) in the sequence of the drive goals 501 to generate a high-resolution driveline (e.g., from the HD map 510) represented as series of poses for the AV. Each pose can be at a predetermined distance. For example, the poses can be one to two meters apart. A pose can be defined by more, fewer, or other quantities as coordinates (x, y, z), roll angle, pitch angle, and/or yaw angle.

As mentioned above, the driveline data can be used to determine (e.g., generate, calculate, etc.) a coarse driveline. The driveline concatenation module 522 splices (e.g., links, fuses, merges, connects, integrates, or otherwise splices) the input data of the driveline data layer 502 to determine the coarse driveline along the longitudinal direction (e.g., along the path of the autonomous vehicle). For example, to get from location A (e.g., work) to location D (e.g., home), to determine the coarse driveline, the driveline concatenation module 522 can use input data from the parking lot data 518 to determine a location of an exit from the work location parking lot to exit to the main road, can use data from the HD map data 510 to determine a path from the main road to the home, and can use data from the recorded paths data 514 to navigate into the garage at home.

The coarse driveline does not include speed information. However, in some examples, the coarse driveline can include speed limit information, which can be used (e.g., extracted) from the HD map data 510. The strategic speed plan module 524 determines specific speed(s) along the different portions of the coarse driveline. For example, the strategic speed plan module 524 can determine that, on a first straight section of the coarse driveline, the speed of the autonomous vehicle can be set to the speed limit of that first straight section; and on a subsequent second curved section of the coarse driveline, the speed of the autonomous vehicle is to be set to a slower speed. As such, the strategic speed plan module 524 computes a law-abiding (e.g., respecting speed limits and stop lines), comfortable (e.g., physically and emotionally), and physically realizable speed profile (e.g., speed versus distance along the driveline) for the coarse driveline considering the current state (e.g., speed and acceleration) of the AV but not considering other road users or static objects.

Once a strategic speed plan is determined by the strategic speed plan module 524, the driveline synthesis module 526 can adjust the coarse driveline laterally. Considering the strategic speed profile and the coarse driveline with lateral discontinuities, the driveline synthesis module 526 determines the start and end locations of the lane change and synthesizes a driveline connecting the two locations. The length of the lane change can be speed dependent.

The driveline synthesis module 526 can synthesize drivelines joining laterally-discontinuous locations in the coarse driveline. For example, assume that the HD map data 510 includes a first section of the coarse driveline that is on a first lane of a road but that a second section of the coarse driveline is on a second lane of the same road. As such there exists a lateral discontinuity in the coarse driveline. The driveline synthesis module 526 first determines a transition distance (or, equivalently start and end locations) over which the AV should transition from the first lane to the second lane. That is, the start position is the road position when the autonomous vehicle is to be controlled to start moving from the first lane to the second lane. The end position is the road position when the autonomous vehicle is to have completed the lane change. The lateral continuity module then generates new driveline data joining the start position in the first lane to the end position in the second lane.

The transition determined by the driveline synthesis module 526 can be speed dependent. For example, a shorter transition distance can be required for the AV to transition from the first lane to the second lane when the AV is moving at a slower speed than when the AV is moving at a higher speed. For example, in a heavy traffic situation where the autonomous vehicle is traveling at a slower speed (e.g., 15 MPH), 20 yards may be required for the transition; however, if the autonomous vehicle is traveling at a higher speed (e.g., 65 MPH), then the transition distance may be 100 yards. As such, the driveline synthesis module 526 can determine the transition position depending on the speed of the AV.

The output of the driveline synthesis module 526 is provided to the object avoidance layer 506. The output of the driveline synthesis module 526 includes the coarse driveline and the strategic speed plan. The object avoidance layer 506 generates a medium-term, discrete-time speed plan and lateral constraints on the coarse driveline. For discrete points in time the future (or, equivalently, at discrete locations along the path of the AV), the discrete-time speed plan module 528 determines (i.e., calculates) a respective desired speed for the AV.

At the object avoidance layer 506, and as further described below, using the coarse driveline, nearby static objects, and nearby dynamic objects and their predicted trajectories, the object avoidance layer 506 determines (e.g., extracts) a drivable area where the AV can be safely operated. Right and left boundaries are determined. Given a current speed of the AV, a real-time speed plan can be generated. The real-time speed plan can be used to estimate future locations of the AV. The future locations of the AV can be evaluated against future anticipated (e.g., predicted) locations of dynamic objects. The drivable area of the AV is adjusted to remove areas of the drivable area that correspond to (e.g., overlap) locations of the dynamic objects.

At the object avoidance layer 506, the coarse driveline is evaluated and/or adjusted for objects. The objects can be objects external to and proximal to the AV. As such, the objects can be the objects described with respect to the world model module 402 of FIG. 4. As such, given a current speed of the AV, the object avoidance layer 506 generates a real-time speed plan. Using the real-time speed plan, the object avoidance layer 506 can estimate future locations of the AV at discrete future time points. The future locations can be evaluated against the locations of the objects (i.e., the objects of the world model) to provide (e.g., generate) a smooth drive for the AV. Providing a smooth drive (i.e., a smooth trajectory) can be an iterative process, as further described below.

To summarize, a coarse driveline is first generated; a speed plan is then generated from the coarse driveline; and, given the coarse driveline and the speed plan, a trajectory is optimized in view of other objects that are maintained in the world model of the AV, to provide an optimized desired trajectory. The trajectory is optimized in an adjusted drivable area. Non-drivable areas (i.e., areas where the AV cannot be safely driven because of the other objects) are removed from a default drivable area to provide the adjusted drivable area.

FIG. 6 is an illustration of examples 600 of coarse-driveline concatenation. The examples 600 are examples of the operation of the reference-trajectory generation layer 504 of FIG. 5.

In a view 610, an AV 611 is in a rightmost lane 614 of a three-lane road that includes lanes 612-614. Note that the view 610 is an example of a left-hand traffic system (i.e., the traffic in the lanes 612-614 moves from the bottom towards the top of FIG. 6). A route planner, such as the route planning module 404, may have determined, based on HD map data, such as the HD map data 510 of FIG. 5, that the AV 611 is to turn right onto lane 615 of a one-lane road. The HD map may provide the centerline (not shown) for each lane.

In some situations, the driveline of the AV may not coincide with the centerline of a lane or road. For example, the lane 615 may be extra-wide to accommodate parking spaces along the left side of the lane 615. In another example, it may be found that most drivers prefer to drive slightly left of the centerline. As such, the driveline of the AV 611 is to be set to the left of the centerline of the lane 615. As such, the driveline concatenation module 522 determines the geometry of the lanes in order to determine the driveline given the lane geometry (e.g., the lane width). For example, when there is a turn in the coarse driveline, the driveline concatenation module 522 determines where the driveline is to be moved (i.e., off the lane centerline) based on the width of the lane, the turning direction (e.g., right or left), the turning angle, and/or the turning speed. That is, the driveline concatenation module 522 sets the driveline of the AV based on the HD map centerline. In an example, the driveline can be set based on the lane width.

To set the driveline of the AV, the driveline concatenation module 522 determines the geometry of lanes along the coarse driveline. In an example, the driveline concatenation module 522 determines the geometry for a certain distance (e.g., 100 meters, 200 meters, 300 meters, etc.) along the coarse driveline. To determine the geometry, the driveline concatenation module 522 can determine polygons, such as a polygon 616 along the coarse driveline, which can be used to define lane boundaries.

A view 620 illustrates determining the driveline (i.e., a coarse driveline) based on a width 621 of a lane. A right edge 624, a left edge 622, and a centerline 626 of a lane along which the AV 611 is traveling can be obtained from the HD map. The driveline concatenation module 522 determines the driveline 628 (i.e., the coarse driveline) based on the width 621. As such, the driveline 628 is shifted from the centerline 626.

A view 630 illustrates using teleoperation data, such as described with respect to the teleoperation map data 512 of FIG. 5, in order to determine a driveline. As described above, whereas the HD map data are static data, teleoperation data can provide a real-time driveline based on road conditions and/or exceptional situations. For example, a construction zone exists along a driveline 632 of the AV 611. The construction zone is bounded by obstacles, such as a pylon 636, which surround a construction project 634. As such, the driveline concatenation module 522 adjusts, as further described below, the driveline 632 to be a driveline 638 (i.e., a coarse driveline) using a real-time driveline that is provided by the teleoperation data.

A view 640 illustrates a speed-dependent lane change. The speed-dependent lane change can be implemented, as described above, by the driveline synthesis module 526 of FIG. 5. In an example, the decision making module 406 of FIG. 4 provides that the AV 611, traveling along a lane 642, is to be next in a lane 644, for example, because the lane 642 ends or because the AV 611 is to turn left. As such, the AV 611 is to move from the lane 642 to the lane 644 at some point. As the HD map may not provide lane transition information, the reference-trajectory generation layer 504 of the AV 611 determines the lane transition time. As mentioned above, the transition can be speed dependent.

In an example, the trajectory planner 500 (of which the reference-trajectory generation layer 504 is a layer) can determine that at a point X along the coarse driveline, the AV 611 will be moving at a speed Y (as determined by the strategic speed plan module 524). In a case where the AV 611 is moving at a low speed (e.g., 35 MPH), the driveline synthesis module 526 can determine that the transition can be slow. Accordingly, the path to move from the lane 642 to the lane 644 can be as shown by a path 646. On the other hand, if the AV 611 is traveling at a high speed (e.g., 65 MPH), the path to switch lanes requires a longer distance, as shown by a path 648.

The time required to follow the paths 646 and 648 can be the same. However, the distance is different. The distance required for the lane transition when the AV 611 is traveling at a first speed is longer than the distance required when the AV 611 is traveling at a second speed that is slower than the first speed.

A lane-change rate can be used to determine the speed-dependent lane change. That is, the lane-change rate can be used to create a connection between two adjacent lanes, such as the lane 642 and the lane 644 of the view 640. The lane-change rate can be defined in "meters per meter:" How many meters does the path move laterally per meter longitudinally? As mentioned above, the goal is to identify a lane change rate that leads to the completion of the lane change in a target amount of time: If the AV is travelling slowly (for example, during dense rush-hour traffic), the lane change rate is high and takes place over a short distance (e.g., on the order of tens of meters); if the AV is travelling quickly (e.g., at highway speeds), the lane change rate is slow and takes place over a long distance (e.g., on the order of hundreds meters).

Figure 7:
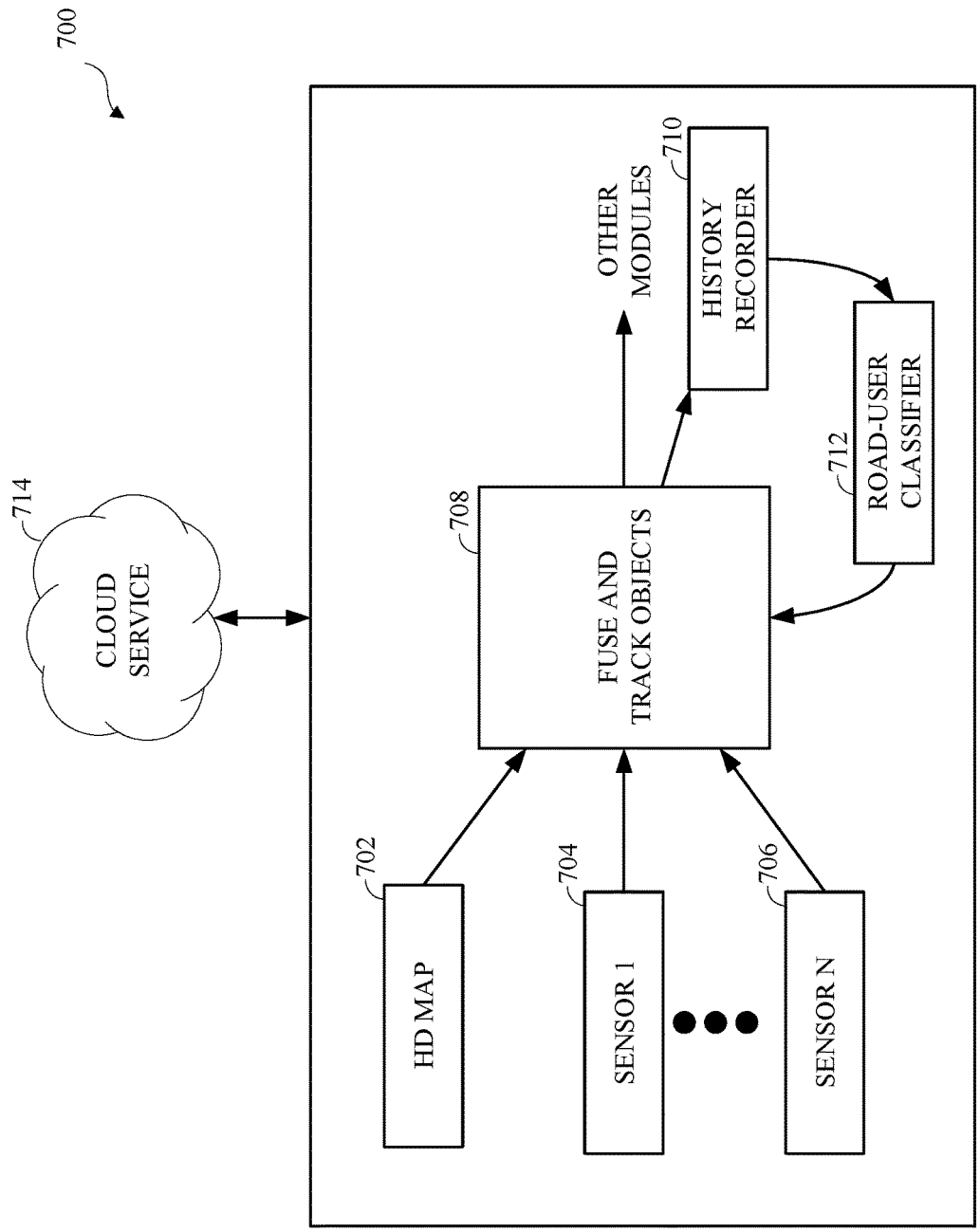
FIG. 7 is an example of a system for road user categorization through monitoring.

FIG. 7 is an example of a system 700 for road user categorization through monitoring. The system 700 can include an HD map module 702, one or more sensor modules 704-706, a fusing-and-tracking module 708, a history recorder 710, and a road-user classifier 712.

The system 700 can be implemented in a vehicle (i.e., a host vehicle), such as the vehicle 100 of FIG. 1 or the vehicle 202 of FIG. 2. The system 700 can be implemented, at least partially, by, or be part of, a trajectory planner, such as the trajectory planner 408 of FIG. 4 or the trajectory planner 500 of FIG. 5. The system 700 can be implemented, at least partially, by, or be part of, a world model module, such as the world model module 402 of FIG. 4. The components (e.g., modules) of the system 700 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the functions of the modules of the system 700 including techniques described herein for road user categorization through monitoring.

The HD map module 702 can be, or can be as described with respect to, the map data 510 of FIG. 5. The HD map module 702 can be used to determine drivelines of mapped lanes. A mapped lane of a road is a lane for which the HD map module 702 includes information. A driveline is a line of a lane such that a longitudinal axis of a vehicle traversing the lane can be expected to align with the driveline. The driveline of a lane can be a center line of the lane or any other reference line of the lane. The HD map can also include pose information of a lane. Pose information of a lane as used herein can mean the heading (e.g., a bearing) of the lane at different discrete locations along the lane.

The one or more sensor modules 704-706 can receive sensor data from respective sensors, such as the sensor 126 of FIG. 1. As mentioned above, the one or more sensor modules 704-706 can be used to identify road users. In an example, the driveline of a lane may be determined using sensor data. For example, a driveline identifying module (not shown) can receive sensor data, identity lane boundaries based on the sensor data, and determine that the driveline of the lane is a median line of the lane. Any technique can be used to identify lane boundaries including, but limited to, identifying lane boundaries as described herein.

The fusing-and-tracking module 708, and as mentioned above, can fuse sensor data from several sensors together to determine (e.g., guess, infer, etc.) the state of the road users. In an example, the fusing-and-tracking module 708 can be, or can be part of, the world model module 402 of FIG. 4. As such, real-world objects (e.g., road users) can be detected based on received sensor data (also referred to herein as measurements or sensor observations). The fusing-and-tracking module 708 can maintain (i.e., associate and update over time) respective state information with the road users. The fusing-and-tracking module 708 can use (e.g., fuse) data from the multiple types of sensors (e.g., cameras, LiDAR, radar, etc.) to estimate at least one of a velocity, a pose (position and heading), a trajectory, a class, and the like of a road users that are external to the vehicle. The information maintained by the fusing-and-tracking module 708 can be used by other modules, as described herein.

The history recorder 710 can record for at least some (e.g., all) of the road users identified by the fusing-and-tracking module 708 respective histories (e.g., trajectory histories). At each time step, the trajectory history of a road user can capture (e.g., include, etc.) a current pose and a current lateral offset with respect to a driveline of the lane that the road user is traversing (e.g., is driving in). The trajectory history can also include a corresponding map pose of the driveline and the map driveline location used to calculate the lateral offset. As such, the history of a road user can be used to identify the location of the road user on the HD map. The trajectory history can also include a current speed of the road user. The trajectory history can also include a current speed limit of the road. Each entry in the trajectory history can be obtained at a discrete time step. The time step (e.g., increment, etc.) can be every 0.25 seconds, 0.5 seconds, or some other time step. A time step of 0.5 seconds is used as an explanation and the disclosure herein is not limited to time steps of 0.5 seconds. The circular buffer can be customizable and, as such, the history entries can be updated at any rate. In an example, the history entries can be recorded at a rate that is based on the speed limit of the road. To illustrate, if the speed limit is 25 mph, then history entries may be recorded at a 0.5 seconds frequency; whereas if the speed limit is 65 mph, then history entries may be recorded at a 0.2 seconds frequency. The frequency can be determined empirically by conducting experiments on how the history entries reflect based on human judgement and/or statistical methods.

The history of a road user can be maintained in a circular buffer. A circular buffer can be a first-in-first-out (FIFO) memory buffer of limited capacity. The circular buffer can be thought of as including a fixed number of slots, N. A first history entry can be stored at a first slot of the circular buffer, a second history entry can be stored at a second slot of the circular buffer, and an $N^{th}$ history entry can be stored at the $N^{th}$ slot of the circular buffer. An $(N+1)^{th}$ history entry can be stored at the first slot of the circular buffer, thereby replacing (e.g., overwriting) the first history entry, an $(N+2)^{th}$ history entry can be stored at the second slot of the circular buffer, thereby replacing (e.g., overwriting) the second snapshot, and so on.

Table I illustrates an example of a trajectory history of a road user. The table I illustrates that the circular buffer includes six (6) slots. The circular buffer can include more or fewer slots. In some implementations, the circular buffer can include more, fewer, other information, or a combination thereof, than those shown in Table I. It is also noted that some of the information shown in Table I may be implicit and may be derived based on other information in Table I.

| Time | Lane ID | Road User Pose | Map Pose | Road User Speed | Speed Limit |
|---|---|---|---|---|---|
| t + 0.5 | | | | | |
| t | ID1 | $(x_5, y_5, \theta_5)$ | $(x'_5, y'_5, \theta'_5)$ | $V_5$ | $V'_5$ |
| t − 0.5 | ID1 | $(x_4, y_4, \theta_4)$ | $(x'_4, y'_4, \theta'_4)$ | $V_4$ | $V'_4$ |
| t − 1.0 | ID1 | $(x_3, y_3, \theta_3)$ | $(x'_3, y'_3, \theta'_3)$ | $V_3$ | $V'_3$ |
| t − 1.5 | ID1 | $(x_2, y_2, \theta_2)$ | $(x'_2, y'_2, \theta'_2)$ | $V_2$ | $V'_2$ |
| t − 2.0 | ID1 | $(x_1, y_1, \theta_1)$ | $(x'_1, y'_1, \theta'_1)$ | $V_1$ | $V'_1$ |

Table I illustrates that a history entry is captured at time increments of 0.5 seconds, as shown in the Time column. The circular buffer may not include the time information as the time information can be inferred based on the time increment and the location in the buffer of a history entry. Table I illustrates that the circular buffer currently includes five (5) history entries and that a new history entry is about to be added at time t+0.5.

A Lane ID column indicates an identifier of a lane that the road user was traversing at the time that the history entry was captured. As mentioned above, each lane in the HD map can be associated with an identifier. As such, the Lane ID column includes the lane identifiers as obtained from the HD map module 702. In some implementations, the circular buffer may not include the lane identifier (i.e., Lane ID) as the lane identifier can be implied from (e.g., derived from, implicit in, etc.) at least one of the Road User Pose or the Map Pose. For example, responsive to receiving a given map pose $(x', y', \theta')$ or at least the coordinates $(x', y')$, the HD map module 702 can provide the corresponding Lane ID.

The Road User Pose column includes coordinates (e.g., positions) and headings of the road user at the respective time steps. The positions and the headings of the road user can be obtained using sensor data, as described herein. The Map Pose column includes the nearest map coordinates and headings corresponding to those in the Road User Pose column. In an example, the circular buffer may not include the Map Pose column. Rather, the Map Pose data can be obtained from the HD map module 702. For example, responsive to receiving a given Road User Pose $(x, y, \theta)$ or at least the coordinate $(x, y)$, the HD map module 702 can provide the nearest Map Pose data $(x', y', \theta')$ included in the HD map. The Road User Poses $(x_i, y_i)$ coordinates can be, can be considered to be, or can be used to obtain, lateral errors (i.e., the lateral-offset values). The angles $\theta_i$ can be, can be considered to be, or can be used to obtain heading errors relative to a lane (i.e., relative to a mapped heading of the lane $\theta'_i$).

The Road User Speed column includes the observed speeds of the road user at the different time steps. The Speed Limit column can include the speed limit of a lane at the location given by the Map Pose or by the Lane ID. In an example, the circular buffer may not include the Speed Limit data. Rather the Speed Limit data may be obtained from the HD map module 702 as (e.g., when, if, etc.) needed. For example, responsive to receiving a given map pose, a road user pose, or a lane ID, the HD map module 702 can provide the speed limit.

The road-user classifier 712 determines a driving behavior of the road user using the history that is maintained in the circular buffer. The road-user classifier 712 can determine the classification (e.g., the category) using lateral offsets. The lateral offsets can be offsets from a reference line (e.g., the center of a lane) associated with a driveline of the road user. The road-user classifier 712 can calculate the lateral offsets using the history entries of the circular buffer. The lateral offsets can be indicative of the driving behavior of the road user. In an example, for a particular history entry of the circular buffer, the lateral offset can be calculated as the distance between the point defined by the road user pose (e.g., $(x_m, y_n)$) and the corresponding map pose (e.g., $(x'_m, y'_n)$). As is known, the distance can be calculated as $d = \sqrt{(x_m - x_m')^2 + (y_m - y_m')^2}$. In another example, the lateral distance can be calculated between the point defined by the road user pose (e.g., $(x_m, y_n)$) and a point on a circle arc defined (e.g., approximated by, etc.) the map pose points ($x'_{m-1}$, $y'_{n-1}$) ($x'_m$, $y'_n$), and ($x'_{m+1}$, $y'_{n+1}$). The point on the circle arc can be the point where a line that passes through the center of the circle of circle arc and the road user pose (e.g., ($x_m$, $y_n$)) interest. Other ways of obtaining the lateral offsets are possible.

In an example, the driving behavior can be determined (e.g., inferred) using machine learning. For example, a machine learning (ML) model can be trained to output a driving behavior based on inputs that include the lateral offsets or that include the road user poses and the map poses. In an example, the ML can output multiple driving behaviors with corresponding probabilities. To illustrate, the ML model may output a distracted driving behavior with a probability of 60% and an inebriated driving behavior with a 22% probability. In another example, the ML model can output one driving behavior, which may be the most probable driving behavior. The ML model can be neural network, such as a Long short-term memory (LSTM) artificial recurrent neural network (RNN).

In another example, the driving behavior can be determined based on a shape defined by the lateral offsets. In an example, a curve may be fit to the points of the circular buffer which may be plotted to produce a visual curve (e.g., a pattern). The visual curve (e.g., an image of the curve) may be input to ML model to output one or more driving behaviors, as described above. The ML model can be a convolutional neural network (CNN) that is trained using images of trajectories or curves associated with the different driving behaviors to output one or more driving behaviors from an input visual curve. In an example, an ML that is a support vector machine may be used to obtain the one or more driving behaviors from the visual curve.

In another example, the driving behavior can be determined statistically (e.g., probabilistically). For example, distributions of lateral-offset values may be constructed (such as based on driving data collected from other road users). The road-user classifier 712 can include, or can have access to, respective distributions of at least some of the driving behaviors determined by the road-user classifier 712. In an implementation, a distribution of the distributions can be localized (e.g., specific to, etc.) the driving area of the road user. The distributions can be used as prior information when classifying the driving behavior of the road user. For example, responsive to the road user having high lateral-offset values in a road section normally characterized by a certain distribution, more confidence (e.g., less uncertainty) can be associated with the determination that the driving behavior is that associated with the distribution.

The distributions of lateral offsets can be used to determine whether the driver behavior classification could be wrongly classified for a normal driving behavior. For example, if at a particular area of the map drivers prefer to drive at a higher lateral offset from the center line due to the way that the road may be designed (e.g., the lane is super wide, is an on-ramp, includes tight turns to other roads, etc.), then a template of the distributions at the particular area may be obtained. Using the template, even if high lateral offsets are determined for a road user, the road-user classifier 712 can classify the driving behavior as normal responsive to the lateral offsets fitting the template. An uncertainty value can be associated with classification based on distributions. Additionally, the distributions can reflect the aggregate behavior of all road users. As such, if a particular road user trajectory fits within the distribution of offsets of all road users, the road-user classifier 712 can consider (e.g., classify) the driving behavior as the normal driving behavior. On the other hand, the road-user classifier 712 may infer atypical driving behavior if a given road user trajectory/path exceeds a predetermined threshold.

The set of lateral-offset values at the different timestamps corresponding to the history entries can be compared with each other to obtain the driving behavior. Responsive to the lateral-offset values of the set being consistently high, the road-user classifier 712 can determine that the driving behavior of the road user is the distracted driving behavior. Responsive to determining that the lateral-offset values oscillate from high to low values, the road-user classifier 712 can determine that the driving behavior of the road user is the inebriated driving behavior. Responsive to determining that the lateral-offset values oscillate from high to low values including many lane changes and that the road user is operating at a high speed, the road-user classifier 712 can determine that the driving behavior of the road user is the reckless driving behavior. Responsive to determining that the speed limit of the road is significantly below the speed limit, the driving behavior of the road user can be determined to the cautious driving behavior. Responsive to determining that the speed limit of the road is significantly above the speed limit, the driving behavior of the road user can be determined to the aggressive driving behavior In an example, the system 700 may communicate with a server 714, which can be the server computing device 234 or the controller apparatus 232 of FIG. 2. In response to determining that the driving behavior of a road user is a non-normal driving behavior, the system 700 (or a component therein, such as the fusing-and-tracking module 708 or the road-user classifier 712) can notify the server 714 (or a component therein) of the road user and the non-normal driving behavior.

In an example, the server 714 may, in turn, notify (e.g., warn, etc.) other road users within the vicinity (e.g., within a 0.5-mile radius or some other vicinity) of the road user. In an example, the notification can indicate (e.g., include, identify, etc.) a location of the road user exhibiting the non-normal driving behavior and an indication (e.g., description) of the non-normal driving behavior. In an example, a message may be displayed, based on the notification, on a display of one of the other road users. The message can indicate (such as visually or textually) the location of the road user with respect to the location of the one of the other road users. In an example, the one of the other road users can use the message to autonomously perform a driving maneuver based on the driving behavior of the road user.

In an example, the system 700 can be used to identify a driving behavior of the host vehicle itself. The system 700 can broadcast (such as via a notification as described herein) the driving behavior of the host vehicle to other road users. At least some of the other road users can use the notification to plan routes that avoid dangerous situations or to plan or execute defensive driving maneuvers responsive to the driving behavior of the host vehicle.

In an implementation, the road-user classifier 712 can associate an uncertainty (e.g., an uncertainty value) with the identified driving behavior. For example, the road user poses, described with respect to Table I, are identified based on sensor data. However, the sensors may be faulty. As such, a definitive classification regarding the driving behavior may not be desirable without further support of the classification. As such, an initial high uncertainty (e.g., 90% or some other initial high uncertainly value) may be associated with the determined driving behavior.

Responsive to the road-user classifier 712 identifying the same trajectory pattern (or, alternatively, the same driving behavior) for the road user in subsequent time steps, the road-user classifier 712 can decrease the uncertainty associated with the identified driving behavior.

For example, every predetermined number of history entries can be used to identify a trajectory pattern (or a driving behavior). In an example, the predetermined number of history entries can be equal to the number of entries in the circular buffer. For example, assuming that the circular buffer includes N entries, then a first trajectory pattern (or a first driving behavior) can be determined using data of the circular buffer obtained at time steps $t_{-N}$ to $t_{-1}$, and a second trajectory pattern (or a second driving behavior) can be determined using data of the circular buffer obtained at time steps $t_0$ to $t_{N-1}$. In another example, a driving pattern can be identified using at least a subset (e.g., all) of the history entries in the circular buffer responsive to a predetermined number of entries being added to the circular buffer. In an example, a driving behavior can be determined using all the history entries of the circular buffer each time a new history entry is added.

In another example, a trajectory pattern (or a driving behavior) can be identified every predetermined time period (e.g., 1 second, 3 seconds, or some other time predetermined period of times). In a case that the circular buffer includes entries obtained in a period longer than the predetermined time period, the road-user classifier 712 can determine the driving behavior using the most recent history entries constituting the predetermined period of time.

Responsive to the first driving behavior and the second driving behavior matching (e.g., being the same driving behavior), the road-user classifier 712 can decrease the uncertainty associated with the first driving behavior. Responsive to the first driving behavior and the second driving behavior not matching, the road-user classifier 712 can increase the uncertainty associated with the first driving behavior and associate the initial high uncertainty with the second driving behavior. As such, the road-user classifier 712 can maintain (e.g., associate with, etc.) one or more driving behaviors for a road user with associated uncertainty values. More generally, the second driving behavior can be matched (e.g., compared to, etc.) to all maintained driving behaviors and increase or decrease their respective uncertainty values based on the matching. Responsive to the uncertainty value of a maintained driving behavior decreasing below a minimal uncertainty value (e.g., 30% or some other uncertainty value), the road-user classifier 712 can identify the maintained driving behavior as the driving behavior of the road user. Responsive to the uncertainty value of a maintained driving behavior increasing above a maximum uncertainty value (e.g., 95% or some other uncertainty value), the road-user classifier 712 can stop maintaining the maintained driving behavior. To illustrate, the road-user classifier 712 may associate, for example, two different driving behaviors to one road user (e.g., a first driving behavior that may be the inebriated driving behavior and a second driving behavior that may be the distracted driving behavior) and also maintains a respective uncertainty estimate of each of the two different driving behaviors. When the uncertainty reaches a value above a threshold for a certain of driving behavior, the road-user classifier 712 can stop maintaining that certain driving behavior.

In an example, the uncertainty value can be increased or decreased by a constant value. In another example, the uncertainty value can be increased or set using a function that uses the number of times that a pattern is consecutively observed. The function can use the number of times that the pattern is observed within a period of time.

In an example, distribution templates can be used to determine the uncertainty or to classify the driving behavior of a road user. In an example, a hierarchy of templates can be used. In an example, situation-specific templates can be used. For example, a distribution template corresponding to the situation of going around a parked car may be available. As such, responsive to the lateral offsets of a road user that is moving away from the center of the lane to go around a parked car falling within the situation-specific going-around-a-parked-car distribution, the road-user classifier 712 does not classify the road user as a distracted driver responsive to a detecting a wavy driving behavior of the road user.

In an example, the road-user classifier 712 can identify the maintained driving behavior as the driving behavior of the road user responsive to identifying the maintained driving behavior a predetermined number of consecutive times or for a consecutive period of time. In an example, respective threshold criteria may be associated with each driving behavior and the road-user classifier 712 can determine the driving behavior of the road user based on the driving behavior over time matching the threshold criteria of the driving behavior. To illustrate, and without limitations, with respect to the distracted driving behavior, the threshold criteria can include that the distracted driving behavior is to be determined for a consecutive period of three seconds; with respect to the inebriated driving behavior, the threshold criteria can include that the inebriated driving behavior is to be identified for a consecutive period of six seconds; or with respect to an aggressive driving behavior, the threshold criteria can be related to a number of times of crossing lane boundaries or a number of times of crossing lane boundaries within a predetermined period of times; and so on. The road-user classifier 712 can maintain a number of times that the road user crosses lane boundaries.

Figure 8A:
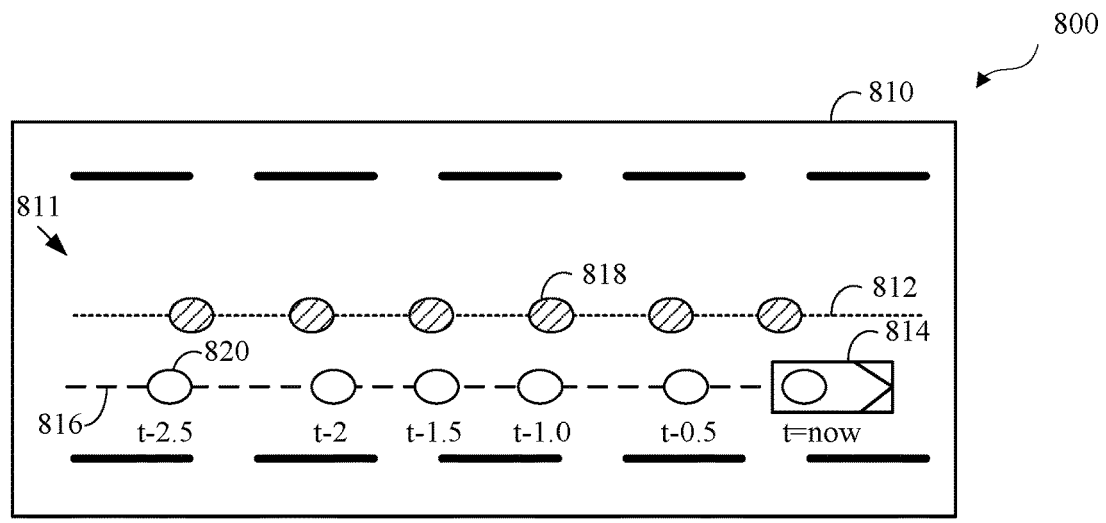
FIGS. 8A-8B illustrate examples of road user categorization through monitoring.
Figure 8A:
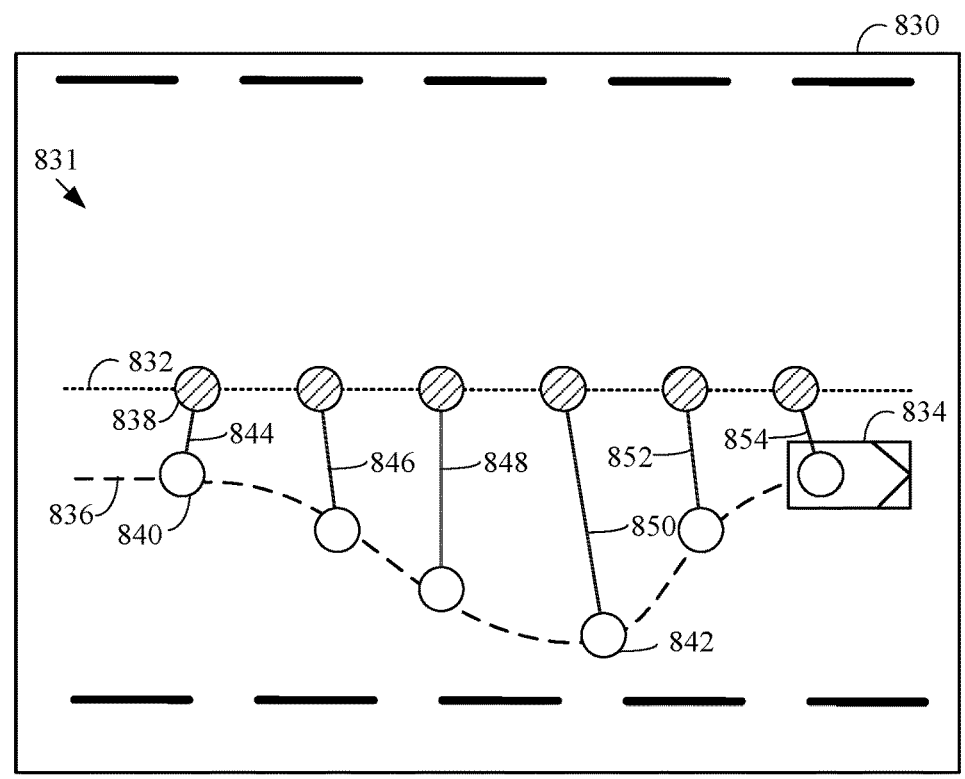
Figure 8B:
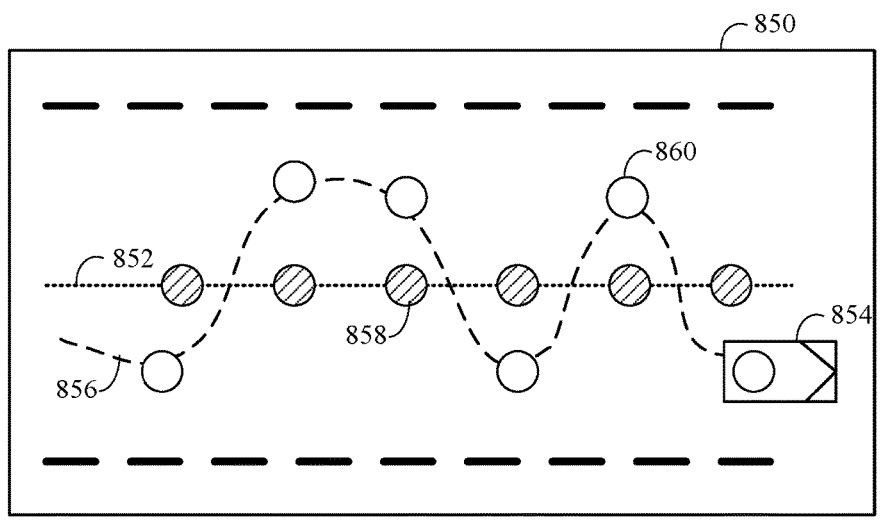
Figure 8B:
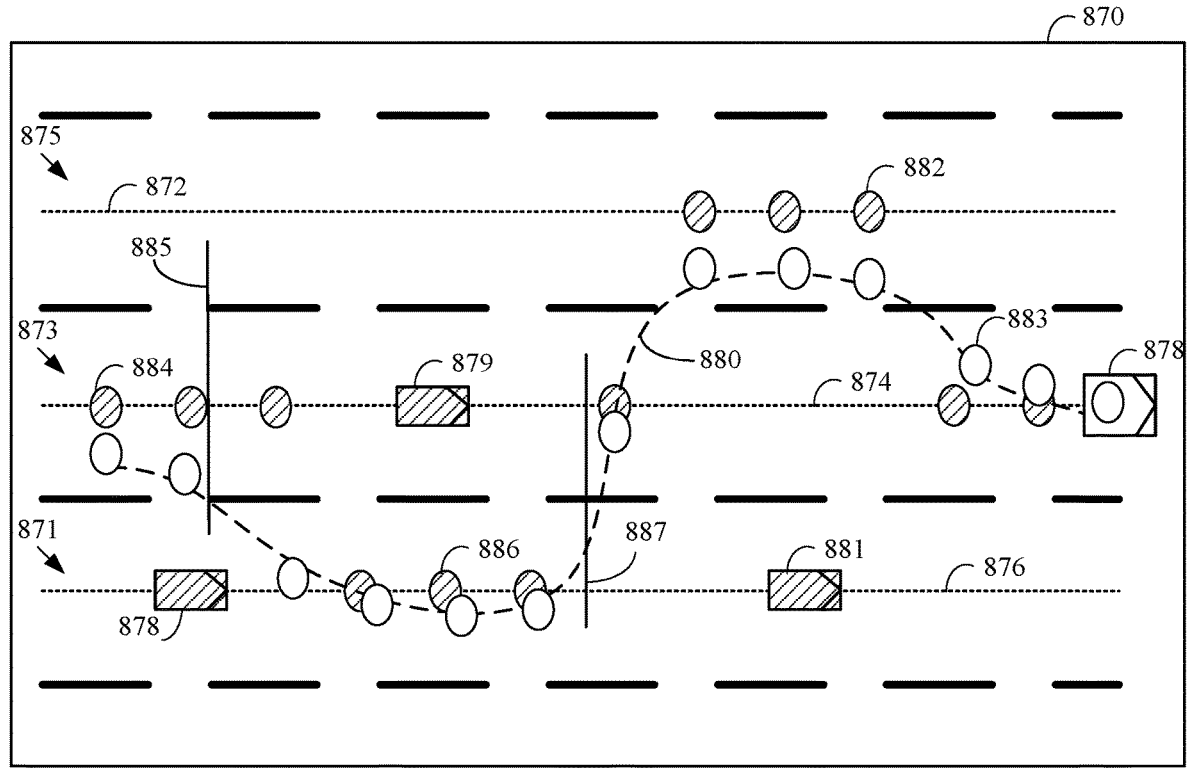

FIGS. 8A-8B illustrates examples 800 of road user categorization through monitoring. FIG. 8A includes scenes 810 and 830 and FIG. 8B includes scenes 850 and 870. In the scenes 810, 830, 850, 870, drivelines 812, 832, 852, 872, 874, 876 (i.e., the dotted lines) illustrate the center lines of, respectively, lanes 811, 831, 851, 871, 873, 875 being traversed, respectively, by vehicles 814, 834, 854, 878. The drivelines 812, 832, 852, 872, 874, 876 can be the lines along which the vehicles 814, 834, 854, 878 can be expected to traverse the respective lanes. Trajectories 816, 836, 856, 880 (i.e., the thin dashed lines) illustrate the trajectories followed, respectively, by the vehicles 814, 834, 854, 878; circles filled with the upward diagonal pattern (e.g., mapped poses 818, 838, 858, 882, 884, 886) illustrate the information (map poses) available in an HD map, as described above with respect to Map Pose column of Table I; and the empty circles (e.g., vehicle poses 820, 840, 860, 883) illustrate observed poses of the respective vehicles, as described with respect to the Road User Pose column of Table I.

With respect to the scene 810, the road-user classifier 712 of FIG. 7 can determine (e.g., infer, identify, select, choose, calculate, etc.), based on lateral-offset values (obtained as described herein), that the vehicle 814 is being driven close to the mapped driveline or that the lateral-offset values are not high and that there are no variations (e.g., fluctuations, etc.) in the lateral-offset values. As such, the road-user classifier 712 can determine that the driving behavior of the vehicle 814 is a normal driving behavior.

In an example, the driving behavior may be determined to be a normal driving behavior and the road-user classifier 712 may determine that the vehicle 814 is consistently, such as over a predetermined period of time (e.g., 20 seconds, 30 seconds, or some other period of time), moving slower than the speed limit. If there is no other vehicle obstructing the path of the vehicle 814, then the road-user classifier 712 can determine that the driving behavior of the vehicle 814 is the cautious driving behavior.

In another example, the road-user classifier 712 may determine that the vehicle 814 is consistently, such as over a predetermined period of time (e.g., 10 seconds, 20 seconds, or some other period of time), moving significantly above the speed limit (such as by 5, 10, or more or less miles per hour; or as a function of the speed limit, such as 10% above the speed limit). Responsive to the determination that the vehicle 814 is moving significantly above the speed limit, the road-user classifier 712 may determine that the deriving behavior of the vehicle 814 is an aggressive driving behavior.

With respect the scene 830, the road-user classifier 712 can determine, based on the lateral-offset values (illustrated by lateral offsets 844-854) that the driving behavior is a distracted driving behavior. The lateral-offset values indicate that, between the vehicle poses 840, 842, the vehicle 834 drifts away (e.g., the lateral offset values increase in magnitude) from the driveline 832 but then returns closer to the driveline 832 (i.e., the lateral offset values decrease in magnitude). Considering the driveline 832 as an axis, it can be observed that the lateral offset values, all being to one side of the axis, have the same sign. As described above, the road-user classifier 712 may associate an uncertainty with the distracted driving behavior. The uncertainty may be decreased responsive to the driving pattern of the vehicle 834 repeating.

With respect to the scene 850, the road-user classifier 712 can determine, based on the lateral-offset values that the driving behavior is an inebriated driving behavior. Taking the driveline 852 as an axis, the road-user classifier 712 determines that the lateral offset values fluctuate in magnitude and in both directions of the driveline 852. That is, the vehicle 854 drifts away from driveline 852 in a first lateral direction, comes back toward the driveline 852, crosses the driveline 852, drifts away from the driveline 852 in a second lateral direction that is opposite the first lateral direction, and then drifts back toward the driveline 852.

In the scene 870, the vehicle 878 is weaving through traffic to get around and past the vehicles 878, 879, 881. It is noted that the scene 870 illustrates a subset of the history entries associated with the vehicle 878 so as not to clutter the drawing. The vehicles 878 and 882 are driving along the driveline 876 of the lane 871 and the vehicle 879 is driving along the driveline 874 of the lane 873. As mentioned above, the system 700 can also monitor the trajectories, and determine the driving behaviors, of one or more of the vehicles 878, 879, 881. Initially, the vehicle 878 may be associated with the lane 873. To the left of a line 885, the driving behavior of the vehicle 878 may be identified as the distracted driving behavior based on the lateral offsets.

Between the line 885 and a line 887, the vehicle 878 is no longer associated with the lane 873 and the road-user classifier 712 of FIG. 7 associates the vehicle 878 with the lane 871. In an example, responsive to the road user crossing the lane boundary, the road-user classifier 712 may no longer associate the distracted driving behavior with the vehicle 878. What appeared to be distracted driving (i.e., drifting away from the driveline 874) seems to be a deliberate action by the vehicle 878 to move to the lane 871. Additionally, the road-user classifier 712 may identify the driving behavior of the vehicle 878 as the inebriated driving behavior (with an initial high uncertainty) based on the lateral offsets as the vehicle 878 twice crossed the driveline 876 between the lines 885 and 887.

After the line 887, the road-user classifier 712 associates the vehicle 878 with the lane 873, then with the lane 875, and then with the lane 873 again. Responsive to the road-user classifier 712 determining that threshold criteria related to the number of times of crossing lane boundaries or the number of times of crossing lane boundaries within the predetermined period of times are met, the road-user classifier 712 identifies the driving behavior of the vehicle 878 as the aggressive driving behavior.

Recognizing (e.g., using) the driving behavior of the road user, a trajectory planner, such as the trajectory planner 408 of FIG. 4 or the trajectory planner 500 of FIG. 5, can plan a trajectory including a driving maneuver to mitigate any risks that may be posed by the road user. The driving maneuver can include maintaining a higher safety margin (e.g., distance, etc.) around road users categorized with non-normal driving behaviors (e.g., distracted or inebriated driving behaviors). The driving maneuver can include avoiding driving in the blind spots of road users categorized with non-normal driving behaviors (e.g., distracted or inebriated driving behaviors). The driving maneuver can include passing road users categorized with non-normal driving behaviors (e.g., the cautious driving behavior). At discrete time points (e.g., every few milliseconds), the trajectory planner can use the determined driving behaviors of road users to generate a smooth trajectory for the host vehicle for a next time window (e.g., a look-ahead time of 6 seconds).

In the case of the reckless driving behavior, the driving maneuver can include maintaining sufficient space between the host vehicle and a preceding vehicle to allow another vehicle (i.e., the recklessly driven road user) to safely move into the space. For example, the weaving from lane to lane of the vehicle 878 of the scene 870 can be an indication that when the vehicle 878 approaches (e.g., gets close to, etc.) the host vehicle, the vehicle 878 may cut off (e.g., cut, in a non-safe way, in front of) the host vehicle. As such, the trajectory planner may plan a trajectory with a gap between the host vehicle and other road users such that there is sufficient space for the vehicle 878 to go through.

In an example, the road-user classifier 712 can use a driving-area driving behavior to determine whether the driving behavior of the road user is non-normal. The driving-area driving behavior refers to an aggregated driving behavior of a current driving area of the road user. For example, the server 714 can receive trajectory histories from vehicles traversing the driving area and can analyze (e.g., aggregate, average, summarize, etc.) the trajectory histories to obtain (e.g., infer, select, choose, determine, etc.) the driving-area driving behavior. The road-user classifier 712 can request the driving-area driving behavior from the server 714 and compare the received driving-area driving behavior to the determined driving behavior. Responsive to the driving-area driving behavior matching the determined driving behavior, the driving behavior of the road user can be determined to be a normal driving behavior.

Figure 9:
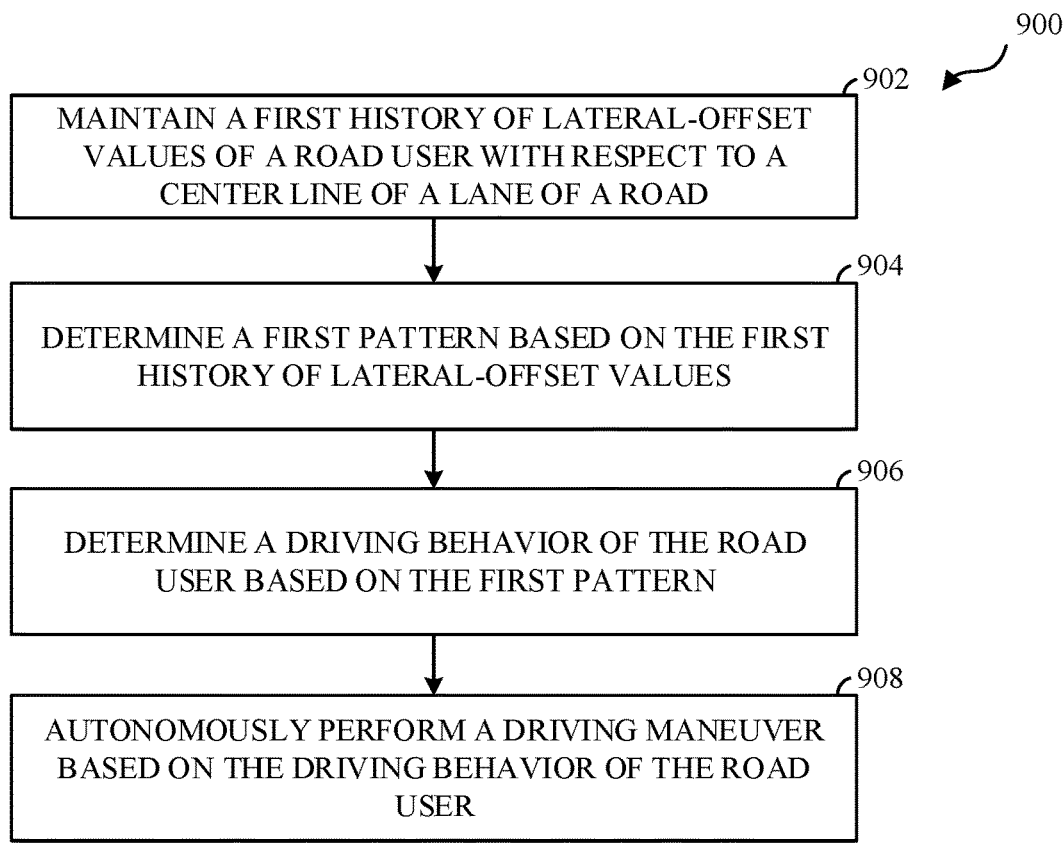
FIG. 9 is flowchart of a technique for categorizing driving behaviors of other road users.

FIG. 9 is flowchart of a technique 900 for categorizing driving behaviors of other road users. The technique 900 can be implemented in a vehicle (i.e., a host vehicle), such as the vehicle 100 of FIG. 1 or the vehicle 202 of FIG. 2. The technique 900 can be implemented can be implemented by the system 700 of FIG. 7. The technique 900 can be implemented, at least partially, by a trajectory planner, such as the trajectory planner 408 of FIG. 4 or the trajectory planner 500 of FIG. 5. The technique 900 can be implemented, at least partially, by a world model module, such as the world model module 402 of FIG. 4. The technique 900 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the technique 900.

At 902, the technique 900 maintains a first history of first lateral-offset values of a road user with respect to a center line of a lane of a road. The first history can be maintained for a predetermined period of time. The technique 900 can maintain the first history as described with respect to Table I. In an example, the center line of the lane of the road can be obtained using (e.g., from, etc.) a high definition map, as described above.

At 904, the technique the technique 900 determines a first pattern based on the first history of the first lateral-offset values. The pattern can be as described above with respect to the visual curve. The pattern can be a pattern of distribution of the lateral-offset values. At 906, the technique 900 determines a driving behavior of the road user based on the first pattern. At 908, the host vehicle can autonomously perform a driving maneuver based on the driving behavior of the road user.

In an example, the technique 900 can determine that the driving behavior of the road user is a distracted driving behavior or an inebriated driving behavior; and the driving maneuver can include a maneuver to avoid driving in a blind spot of the road user. The distracted driving behavior can be determined based on the first lateral-offset values increasing and decreasing in the predetermined period of time and the road user remaining on a side (i.e., one side) of the center line of the lane of the road. The inebriated driving behavior can be determined based on the first lateral-offset values increasing and decreasing in the predetermined period of time and the road user crossing the center line of the lane of the road.

In an example, the driving behavior of the road user is determined to be an aggressive driving behavior and the driving maneuver includes a maneuver for maintaining a first spacing or a second spacing from a third vehicle that is ahead of the vehicle. The first spacing can be such that the road user is unable to cut-in between the vehicle and the third vehicle. The second spacing can be such that the road user is able to cut-in between the vehicle and the third vehicle.

In an example, and as described above, the technique 900 can associate an uncertainty with the driving behavior of the road user based on the first pattern. In an example, the technique 900 can further include maintaining a second history of second lateral-offset values of the road user with respect to the center line of the lane of a road; determining a second pattern based on the second history of the second lateral-offset values; and responsive to the second pattern indicating a same driving behavior as the first pattern, reducing the uncertainty associated with the driving behavior of the road user.

Figure 10:
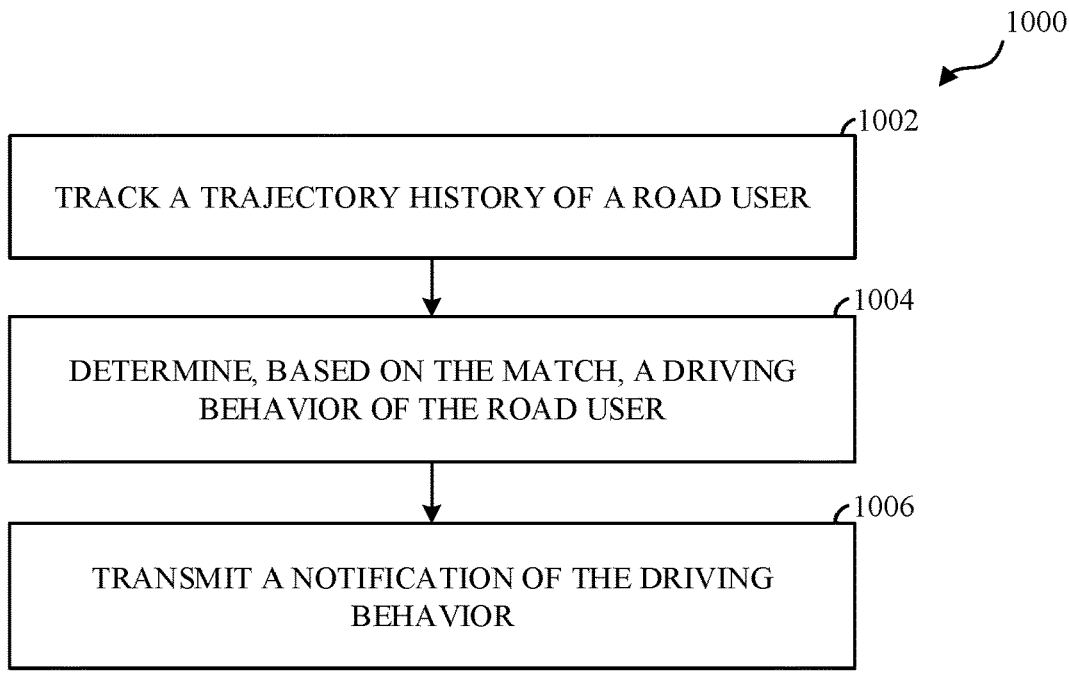
FIG. 10 is flowchart of another technique for categorizing driving behaviors of other road users.

FIG. 10 is flowchart of a technique 1000 for categorizing driving behaviors of other road users. The technique 1000 can be implemented in a vehicle (i.e., a host vehicle, an apparatus), such as the vehicle 100 of FIG. 1 or the vehicle 202 of FIG. 2. The technique 1000 can be implemented can be implemented by the system 700 of FIG. 7. The technique 1000 can be implemented, at least partially, by a trajectory planner, such as the trajectory planner 408 of FIG. 4 or the trajectory planner 500 of FIG. 5. The technique 1000 can be implemented, at least partially, by a world model module, such as the world model module 402 of FIG. 4. The technique 1000 can be implemented, for example, as one or more software programs that may be executed by a processor, such as the processor 120 of FIG. 1. The software program(s) can include machine-readable executable instructions that may be stored in a memory (e.g., a non-transitory computer-readable storage medium) such as the memory 122 of FIG. 1, and that, when executed by the processor, may cause the computing device to perform the technique 1000.

At 1002, the technique 1000 tracks a trajectory history of a road user. Tracking the trajectory history of the road user can include maintaining a trajectory history of the road user, as described herein. At 1004, the technique 1000 determines, based on the trajectory history, a driving behavior of the road user, as described herein. Determining the driving behavior based on the trajectory history can include using locations of the road user and nearest mapped locations in a high definition map of at least one lane to determine the driving behavior.

At 1006, the technique 1000 transmits a notification of the driving behavior. In an example, the notification can be transmitted to a central server, such as described with respect to server 714 of FIG. 7. In an example, transmitting the notification of the driving behavior can include broadcasting the notification to other road users. In an example, and as mentioned above, the driving behavior of a host vehicle itself can be determined. As such, the road user can include or can be the apparatus and the notification of the driving behavior can be transmitted by the road user itself.

In an example, the technique 1000 can issue control commands to the apparatus to autonomously perform a driving maneuver based on the driving behavior of the road user.

For simplicity of explanation, the techniques 900 and 1000 of FIGS. 9 and 10, respectively, are depicted and described as a series of operations. However, the operations in accordance with this disclosure can occur in various orders and/or concurrently. Additionally, other steps or operations not presented and described herein may be used. Furthermore, not all illustrated operations may be required to implement a technique in accordance with the disclosed subject matter.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of categorizing driving behaviors of other road users, comprising:
    maintaining a first history of first lateral-offset values of a road user at different time steps with respect to a center line of a lane of a road that the road user is traveling on, wherein
        the first history of the first lateral-offset values are determined based on one or more road user poses,
        the first history is maintained for a predetermined period of time, and
        the road user and a host vehicle are contemporaneously traversing the road;
    maintaining a second history of second lateral-offset values of the road user with respect to the center line of the road, wherein the second lateral-offset values are determined based on one or more road user poses;
    fitting a curve to a plot of the first lateral-offset values of the road user with respect to the center line of the lane;
    determining a first pattern based on the curve;
    determining a second pattern based on the second history of the second lateral-offset values;
    determining a driving behavior of the road user based on the first pattern;
    associating an uncertainty with the driving behavior of the road user based on the first pattern, wherein the uncertainty is determined by a distribution of the first lateral-offset values and the second lateral-offset values;
    reducing the uncertainty associated with the driving behavior of the road user in response to the second pattern indicating a same driving behavior as the first pattern; and
    autonomously performing, by the host vehicle, a driving maneuver based on the driving behavior of the road user, wherein autonomously performing the driving maneuver based on the driving behavior of the road user comprises:
        determining that the driving behavior of the road user is a distracted driving behavior or an inebriated driving behavior; and
        in response to determining that the driving behavior of the road user is the distracted driving behavior or the inebriated driving behavior, autonomously performing a maneuver as to avoid driving the host vehicle in a blind spot of the road user.

2. The method of claim 1, wherein the center line of the lane of the road is obtained using a map usable for autonomous driving.

3. The method of claim 1, wherein the distracted driving behavior is determined based on the first lateral-offset values increasing and decreasing in the predetermined period of time and the road user remaining on a side of the center line of the lane of the road.

4. The method of claim 1, wherein the inebriated driving behavior is determined based on the first lateral-offset values increasing and decreasing in the predetermined period of time and the road user crossing the center line of the lane of the road.

5. The method of claim 1,
    wherein the driving behavior of the road user is determined to be an aggressive driving behavior,
    wherein the driving maneuver comprises maintaining a first spacing or a second spacing from a third vehicle that is ahead of the host vehicle,
    wherein the first spacing is such that the road user is unable to cut-in between the host vehicle and the third vehicle, and
    wherein the second spacing is such that the road user is able to cut-in between the host vehicle and the third vehicle.

6. An apparatus, comprising:
    one or more sensors configured to obtain information regarding a physical environment surrounding a vehicle, wherein the information includes a road user pose information; and
    a processor, the processor configured to:
        track a trajectory history of a road user, wherein the trajectory history of the road user includes map pose information and the road user pose information of the road user at different time steps, wherein the map pose information is obtained from a map usable in autonomous driving, and wherein the road user pose information is obtained using the one or more sensors;

determine, based on the trajectory history, a driving behavior of the road user, wherein to determine the driving behavior of the road user comprises to:
  determine, based on the map pose information and the road user pose information, a first set of lateral-offset values and a second set of lateral-offset values of the road user with respect to a reference line of a lane of a road that the road user is traveling on at the different time steps, and
  compare the first set of lateral-offset values and the second set of lateral-offset values at the different time steps with each other;

determine an uncertainty associated with the driving behavior of the road user based on a distribution of the first set of lateral-offset values and the second set of lateral-offset values;

reduce the uncertainty associated with the driving behavior of the road user in response to the first set of lateral-offset values and the second set of lateral-offset values indicating a same driving behavior; and autonomously perform a driving maneuver based on the driving behavior of the road user, wherein to autonomously perform the driving maneuver based on the driving behavior of the road user comprises:
  in response to determining that the driving behavior of the road user is a distracted driving behavior or an inebriated driving behavior, autonomously perform a maneuver as to avoid driving the vehicle in a blind spot of the road user.

7. The apparatus of claim 6, wherein the processor is further configured to:
  transmit a notification of the driving behavior to at least one of other road users or a central server.

8. The apparatus claim 6, wherein to determine, based on the trajectory history, the driving behavior of the road user comprises to:
  determine the driving behavior based on locations of the road user and nearest mapped locations in the map of at least one lane.

9. The apparatus of claim 6, wherein the processor is further configured to:
  issue control commands to the apparatus to autonomously perform the driving maneuver based on the driving behavior of the road user.

10. A non-transitory computer-readable storage medium of a host vehicle, comprising executable instructions that, when executed by a processor, perform operations to:
  store, in a circular buffer, road user poses of a road user, wherein the road user and the host vehicle are contemporaneously traversing a road;
  obtain a first set of lateral-offset values and a second set of lateral-offset values at different time steps using the road user poses and corresponding map poses of a map usable for autonomous driving;
  determine a count of a number of times that the road user crossed lane boundaries;
  determine a driving behavior of the road user based on the first set of lateral-offset values, and the count;
  determine an uncertainty associated with the driving behavior of the road user based on a distribution of the first set of lateral-offset values and the second set of lateral-offset values;
  reduce the uncertainty associated with the driving behavior of the road user in response to the first set of lateral-offset values and the second set of lateral-offset values indicating a same driving behavior;
  determine, based on the driving behavior, a trajectory that includes a driving maneuver, wherein in a case that the driving behavior of the road user is a distracted driving behavior or an inebriated driving behavior, the driving maneuver comprises a maneuver to avoid driving the host vehicle in a blind spot of the road user; and
  control the host vehicle according to the trajectory.

11. The non-transitory computer-readable storage medium of claim 10, wherein in a case that the driving behavior of the road user is determined to be an aggressive driving behavior, the driving maneuver comprises maintaining a first spacing or a second spacing from a third vehicle that is ahead of the host vehicle, the first spacing is such that the road user is unable to cut-in between the host vehicle and the third vehicle, and the second spacing is such that the road user is able to cut-in between the host vehicle and the third vehicle.

12. The non-transitory computer-readable storage medium of claim 10, wherein the operations further comprise operations to:
  transmit a notification of the driving behavior.

13. The non-transitory computer-readable storage medium of claim 12, wherein the notification is transmitted to other road users.

14. The non-transitory computer-readable storage medium of claim 12, wherein the notification is transmitted to a central server.

* * * * *